US009621357B2

(12) United States Patent
Williams et al.

(10) Patent No.: US 9,621,357 B2
(45) Date of Patent: Apr. 11, 2017

(54) SYSTEM AND METHOD FOR PROVIDING CONSENT MANAGEMENT

(71) Applicant: Araxid Prime, Inc., McLean, VA (US)

(72) Inventors: J. B. Williams, Arlington, VA (US); Tara Figley, Morrisville, NC (US)

(73) Assignee: VERATO, INC., McLean, VA (US)

( * ) Notice: Subject to any disclaimer, the term of this patent is extended or adjusted under 35 U.S.C. 154(b) by 27 days.

(21) Appl. No.: 14/516,237

(22) Filed: Oct. 16, 2014

(65) Prior Publication Data
US 2016/0112208 A1    Apr. 21, 2016

(51) Int. Cl.
*G06F 21/00* (2013.01)
*H04L 29/06* (2006.01)
*G06F 21/62* (2013.01)
*H04L 9/32* (2006.01)
*H04L 9/00* (2006.01)
*G06F 19/28* (2011.01)

(52) U.S. Cl.
CPC ........ *H04L 9/3268* (2013.01); *G06F 21/6218* (2013.01); *H04L 9/006* (2013.01); *H04L 9/3247* (2013.01); *H04L 63/101* (2013.01); *H04L 63/0823* (2013.01)

(58) Field of Classification Search
CPC . H04L 9/3268; H04L 63/0823; H04L 9/3247; H04L 63/101; H04L 9/006; G06F 21/6218
See application file for complete search history.

(56) References Cited

U.S. PATENT DOCUMENTS 7,188,252 B1   3/2007 Dunn
7,269,853 B1   9/2007 Dunn
7,454,508 B2   11/2008 Mathew et al.
(Continued)

FOREIGN PATENT DOCUMENTS

EP       1394698 A2    3/2004
JP    2004288094 A    10/2004
(Continued)

OTHER PUBLICATIONS

Mohammad Jafari, Reihaneh Safavi-Naini, Nicholas Paul Sheppard; "A rights management approach to protection of privacy in a cloud of electronic health records"; Oct. 2011; DRM '11: Proceedings of the 11th annual ACM workshop on Digital rights management; Publisher: ACM; pp. 23-29.*
(Continued)

*Primary Examiner* — David Garcia Cervetti
*Assistant Examiner* — Courtney Fields
(74) *Attorney, Agent, or Firm* — Fox Rothschild LLP; Jeff E. Schwartz

(57) ABSTRACT

A system and method for managing consent for an enterprise to, for example, provide access to controlled data to another enterprise wherein the controlled data can be in the form of subject data records. The system includes a consent management module operative to associate a plurality of control levels with a subject data record and process a consent request requesting access to the controlled data. Access is determined based on the control levels associated with a subject of the controlled data, a requesting operator, and/or the controlled data itself, A control level data set comprising the control levels for use in controlling access to the controlled data and/or subject data records is stored in a database.

18 Claims, 9 Drawing Sheets

(56) References Cited

U.S. PATENT DOCUMENTS

| | | | |
|---|---|---|---|
| 7,590,705 B2 | 9/2009 | Mathew et al. | |
| 7,610,391 B2 | 10/2009 | Dunn | |
| 7,711,835 B2* | 5/2010 | Braddy | G06F 17/30867 709/202 |
| 7,801,747 B2 | 9/2010 | Califano et al. | |
| 7,860,793 B2 | 12/2010 | Karkanias et al. | |
| 2004/0133454 A1 | 7/2004 | Desio | |
| 2006/0178913 A1 | 8/2006 | Lara et al. | |
| 2007/0180493 A1* | 8/2007 | Croft | G06F 3/1415 726/2 |
| 2009/0210347 A1 | 8/2009 | Sarcanin | |
| 2010/0094650 A1 | 4/2010 | Tran et al. | |
| 2012/0151557 A1 | 6/2012 | Ahmed et al. | |
| 2012/0203571 A1 | 8/2012 | Crapo et al. | |
| 2012/0254320 A1* | 10/2012 | Dove | G06F 19/3418 709/206 |
| 2013/0014278 A1 | 1/2013 | Jin et al. | |

FOREIGN PATENT DOCUMENTS

| | | | |
|---|---|---|---|
| JP | 2005141642 A | 6/2005 | |
| JP | 2009134442 A | 6/2009 | |
| JP | 2010250597 A | 11/2010 | |
| JP | 2011175562 A | 9/2011 | |
| WO | 02097693 A2 | 12/2002 | |
| WO | 2004023710 A2 | 3/2004 | |
| WO | 2008129282 A1 | 10/2008 | |
| WO | 2012106998 A1 | 8/2012 | |
| WO | WO 2016036401 A1 * | 3/2016 | G06F 17/30507 |

OTHER PUBLICATIONS

Tsiknakis et al., "An open, component-based information infrastructure for integrated health information networks," International journal of Medical Informatics (2002): 68:3-26.

Sheppard et al., "A digital rights management model for healthcare," IEEE (2009): pp. 106-109.

Mont et al., "Privacy policy enforcement enterprises with identity management solutions," Hewlett-Packard (2006): pp. 1-12.

O'Keefe et al., "A decentralised approach to electronic consent and health information access control," Journal of Research and Practice in Information Technology (May 2005) 37(2):161-178.

van der Linden et al., "Inter-organizational future proof EHR systems a review of the security and privacy related issues," International Journal of Medical Informatics (2009): vol. 78, pp. 141-160.

Kotz et al., "A privacy framework for mobile heatlh and home-care systems," SPIMACS (2009); pp. 1-12.

Karjoth et al., "Privacy-enabled Services for Enterprises," (Research Report); IBM Research (Jan. 21, 2002); 9 pages.

Karjoth et al., "Platform for Enterprise Privacy Practices: Privacy-enbaled Management of Customer Data," IBM Research (Spring Verlag 2002): 16 pages.

Jahnke et al., "Consumer Health Informatics Services—Certification Programs—Strengths and Weaknesses," University of Victori Department of COmputer Science (Jul. 23, 2011): 68 pages.

Heinze et al, "Architecture of a consent management suite and integration into IHE-based regional health information networks," BMC Medical Informatics and Decision Making (2011): 11:58, pp. 1-7.

Buffett et al., "Towards a Model for Risk and Consent Managent of Private Health Information," NRC-CNRC (2006) 6 pages.

Bonnici et al., "Principled Electronic Consent Management—A Preliminary Research Framework," 5 pages.

Ashley et al., "From Privacy Promises to Privacy Management—A New Approach for Enforcing Privacy throughout an Enterprise," pp. 43-50.

Sun Microsystems: horizons Healthcare Integration through a New Perspective 2010 "Identity Management: Securing Information in the HIPAA Environment," 33 pages.

* cited by examiner

SYSTEM AND METHOD FOR PROVIDING CONSENT MANAGEMENT

FIELD OF THE DISCLOSURE

This disclosure is in the field of computer systems, specifically consent management systems managing data access controls across federated networks.

BACKGROUND

Conventional consent management systems exist that allow an enterprise to exert control over sharing privileges for controlled data. Conventional systems may typically rely upon the enterprise in which the data is resident to implement an access control system to govern access and distribution of information.

SUMMARY OF THE INVENTION

Consent Management Systems (CMS) may include systems designed to allow information systems housing sensitive information, e.g. law enforcement data, medical records, financial data, and the like, to instantiate and validate information access control permissions in a third party system external to the individual enterprises involved in the information sharing. CMS can be tailored specifically for instances where access control may be governed by both the enterprise that has control of the information, e.g., a hospital or law enforcement organization, and by external influencers. These external influencers may not actually be external to the enterprise, but may be, from a technical point of view, outside of the normal information control and governance process.

These external influencers may be the subject of the information, e.g., a patient, customer, employee, licensee, and the like, or may be the originator of the information, e.g., a law enforcement organization, government organization, a healthcare provider, and the like, that has transferred the control of a piece of information or record to another organization.

These external influencers can seek to have the technical and/or legal means to control the access and distribution of the information that exists about them or the technical and/or legal means to control access are provided to a third party because the information may be private and/or sensitive. For example, in one scenario, this data should preferably only be updated by the originator even when the data is outside their sphere of control. The external influencers may also seek to define how and with whom the information can be shared or used and/or who can view or change the information.

CMS can generally be used for any market. CMS can be flexible in that the granularity and type of control can be tuned to enterprise requirements. Finally, CMS may be a reference system in the sense that it exists above the enterprise systems that rely upon it so that those enterprises can consume the consent management information in order to process the individual information access control transactions.

CMS may be supported by a public key infrastructure (PKI) to digitally sign the consent management orders. The private key for the enterprise and/or individual can be stored in a secure digital signing repository. The public key may be accessible to some or all consumers of the CMS to verify that a digital signature was produced at the time of verification of consent and determine whether it remains valid and enforceable at any given point in time.

In an exemplary embodiment, a consent management system may allow controlled data to be interactively shared among operators of the same or other consent management systems. A first database may store a control data record. The first database may be in communication with a computer based consent management system operated by a sharing operator. The control data record may contain control levels which define a distinct set of controls that are applied to the controlled data. At least some of the control levels are applied based reference data associated with a subject.

A second database may store a subject data record associated with the subject. The second database can be in communication with the consent management system. At least a portion of the subject data record may be controlled data that is associated with control levels based reference data associated with said controlled data.

The consent management system (e.g., a processor in communication with a computer readable medium) may execute program instructions which, when executed, instructs the system to process a consent request requesting access to said controlled data, wherein said consent request includes reference data associated with the requesting operator. The consent request may be received from a requesting operator operating a second computer based consent management system.

A control level data set can be stored in the first database. The control level data set may include the control levels associated with said controlled data in said subject data record. The consent management system may interactively share, with the requesting operator, the control level data set based on the control levels associated with the subject, the control levels associated with the controlled data, and the control levels associated with the requesting operator. A determination whether to grant the requesting operator access to the controlled data may be based on said at least a portion of said control level data set that is interactively shared.

DETAILED DESCRIPTION OF THE PREFERRED EMBODIMENTS

Figure 1:
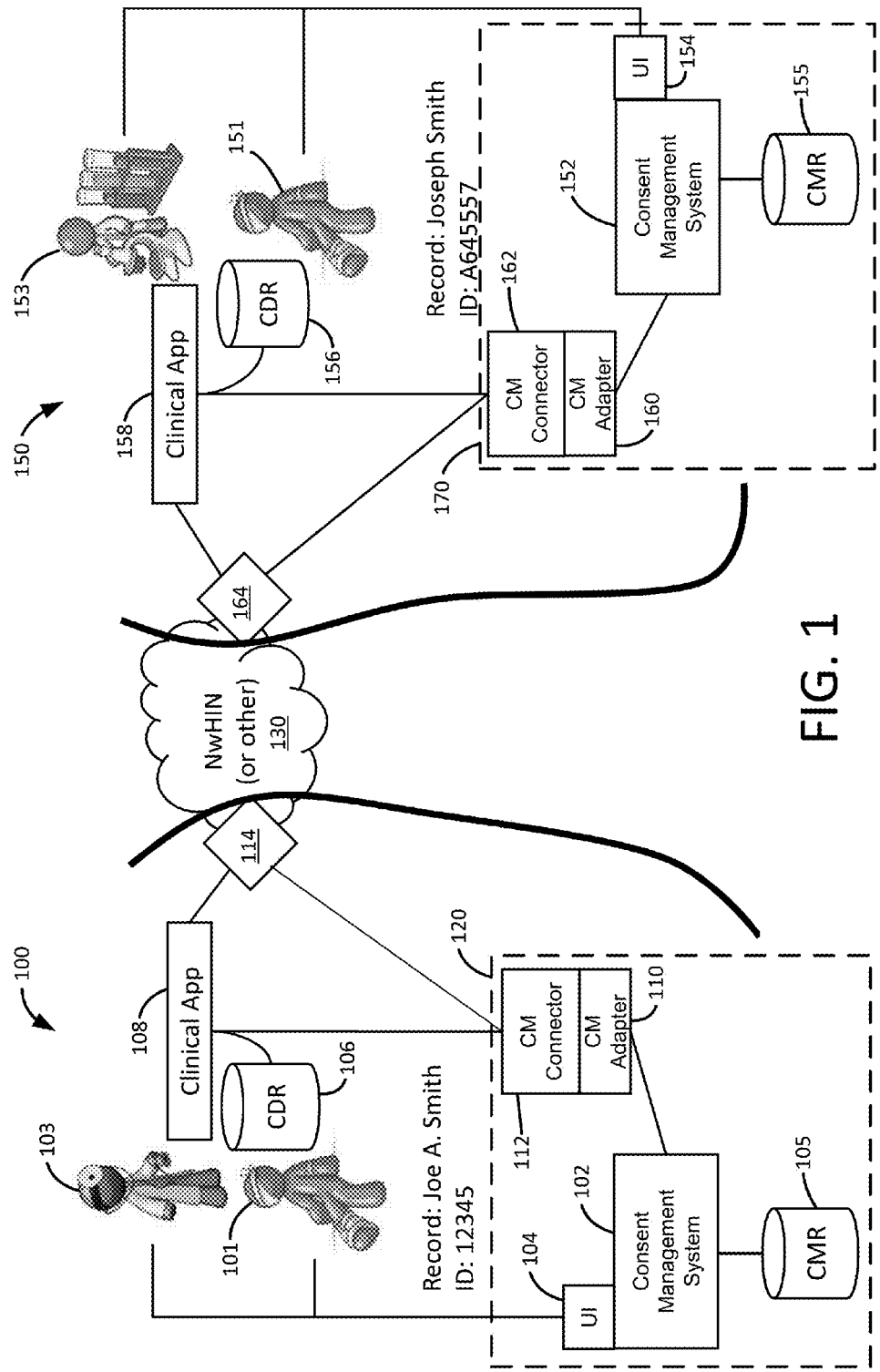
FIG. 1 is a 'block diagram showing an example topology of an embodiment of a consent management system.

Embodiments of the present invention are not limited to the particular methodology, uses, and applications described herein, as these may vary. It is also to be understood that the terminology used herein is used for the purpose of describing particular embodiments only and is not intended to limit the scope of all embodiments of the present invention. It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art. Similarly, for another example, a reference to "a step" or "a means" is a reference to one or more steps or means and may include sub-steps or subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete and will fully convey the concept of the invention to those skilled in the art.

Unless defined otherwise, all technical and scientific terms used herein have the same meanings as commonly understood by one of ordinary skill in the art to which this invention belongs. Preferred methods, techniques, devices and materials are described although any methods, techniques, devices, or materials similar or equivalent to those described may be used in the practice or testing of the present invention.

All patents and other publications discussed are incorporated herein by reference for the purpose of describing and disclosing, for example, the methodologies described in such publications that might be useful in connection with the present invention. These publications are provided solely for their disclosure prior to the filing date of the present application. Nothing in this regard should be construed as an admission that the inventors are not entitled to antedate such disclosure by virtue of prior invention or for any other reason.

As used in this document, "controlled data" means confidential, proprietary, and/or protected information that is desired to be or potentially be restricted in access to distribute, edit, view, append, delete, discover, or otherwise distribute. Distribution may be limited to a one-time distribution, but could revoke that status/permission/privilege selectively in the future. Data belongs to a type, and data may be: i) tagged with the type, ii) stored in a particular repository because of its type, or iii) otherwise associated with a type. The type of data may be associated with a composite set of data, or individual data elements, and the type based upon the i) content of the data; ii) the originator, operator, or subject of that data; or iii) the systems in which it is processed including networks, storage devices/media, software applications, data acquisition devices, or other computer systems.

As used in this document, the term "share" means provide access to at least one control. As used in this document, the term "control" means, for example, retrieving, downloading, viewing, editing, transferring, deleting, discovering, or otherwise utilizing or visualizing data in a computer system. To share a data record, or controlled data in the data record, means to provide such access to at least one control as described above to another entity. As used in this document, the term "entity" means a natural person, a group of natural persons, a computer system, an organization such as a business entity, non-profit organization, or government agency, and the like.

As used in this document, the term "subject" means an individual or group of individuals that have authority over how controlled data in a subject data record (i.e., a data record over which the subject has authority) is shared or controlled. Such sharing and/or control can be: i) manual (i.e., by the individual or group of individuals); or ii) automatic (i.e., by pre-determined rule, by inspection of the controlled data, by dates associated with the data; by evaluation of the content of the controlled data, by the identity of the controlled data; by attributes of the subject (such as age or gender); and/or by the situation in which data was collected or generated (i.e., known to be collected in a hospital (maybe object determined)). In a typical scenario, controlled data has a default (automatic) control scheme which is applied without any manual interactions. Additionally, said default control scheme may change, and the change in the default may or may not require notification to the subject, originator, or operator. However, once the default control scheme is established, the subject, or anyone else the subject grants the requisite consent to and/or anyone else that has the authority to engage in direct control over the controlled data, may manually select a control scheme. The designation of authority to change the control scheme can also be exercised automatically by a system that has been configured to change the control scheme by anyone else that has the authority to engage in direct control over the controlled data, and they may manually select a control scheme. Nonexclusive examples of subjects (and controlled data) include a patient (medical records), a banking customer (bank/investment records), a police investigator (investigation file), a team of intelligence analysts (intelligence file), and the like.

As used in this document, the term "object" means the subject matter of the data in the subject data record over which the subject has authority. An object may be the same as the subject (i.e., may be an individual, group of individuals, or other legal entity that has authority over how data in the subject data record is shared or controlled). For example, a subject data record may contain medical and healthcare data about a patient (i.e., the subject). The object of the medical and healthcare data is also the patient. In this example, the subject and the object are the same. The object may also be a person different than the subject. For example, a subject data record may contain information about an individual, group of individuals, or other legal entity that is not the subject and does not have authority over how data in the subject data record is shared or controlled, such as a target of investigation (e.g., a suspect in a criminal investigation) or a high ranking government official. The object may also be a topic or an inanimate object. For example, the object may be classified information or a corporate trade secret.

As used in this document, the term "operator" means an individual or group of individuals, or business entity, represented by an individual or group of individuals that operates a computer system housing or requiring access to controlled data. A requesting operator is an operator that requests access to controlled data to which access is controlled by an owner or a subject (or both). A sharing operator is an operator who is operating the consent management system and has authority to make sharing decisions. The sharing operator manually configures or sets parameters for automatic configuration.

As used in this document, the term "owner" means a subject, operator, or other entity with authority to act on behalf of a subject. An owner has direct control over consent management system components. An owner could be a patient in the medical record context, who owns the data regardless of how it was entered. In another example, an owner's authority is implied through ownership of the system, but may be revoked by the subject. For example, a doctor may enter information and be an owner of that data. An owner may be a legal entity (e.g., a natural person, any group and/or association of natural persons, a legal corporate entity, and the like) that has authority to determine how, to whom, and under what circumstances all controlled data within the owner's possession is shared with other entities. In a typical implementation, a subject's authority overrides an owner's authority, i.e. a subject may revoke the authority for an owner to possess the data. The subject may also be an owner to the extent they possess the information associated with themselves. In certain implementations, the subject may have no control over the controlled data. For example, criminal investigation files are "owned" by a law enforcement agency, and may be owned by individual law enforcement officers (e.g. intelligence analysts would likely be owners of the information in their intelligence files) in the sense that those officers have authority to control access to the controlled data (e.g., classified intelligence information). However, the subject of the investigation (the entity the data is about) has no control and, likely, little to no knowledge that the data even exists.

As used in this document, the term "originator" means an owner, who may be the subject, and who creates at least a portion of controlled data in a data record. An originator is also an owner because, by having consent to create data associated with the subject, the originator has the implied consent to possess the information. As with any owner (who is not the subject), the subject may revoke the authority for an originator to possess the information the originator created that is associated with the subject. Alternatively, there are instances where the owner (who is not the subject) may have the legal right to retain access to the information they originated or used to originate the information (e.g. a physician who receives labs on a patient, then makes a determination on a course of care, legally have the authority to retain the information on which they made the determination as well as the information they originated). Therefore, an originator may not necessarily be an owner of the data they create. For example, a local law enforcement official may originate data that will be stored in the intelligence file, but does not have any authority to possess the data after it is stored in the intelligence file. In another example, a medical diagnostics firm may generate data by order of a doctor and place that data in the patient's medical file, but the diagnostics firm may not have authority to control the handling of and/or access to the information in the patient's file. The scenarios described in this document are not limited in this regard.

As used in this document, the term "consent management elements" means the elements which define the identities of the entities and data which are part of a consent management transaction. For example, consent management elements may be the subject/owner, the sharing operator, the requesting operator, and/or the controlled data.

A control level may be a permission or consent to access, discover, operate, manage, change, edit, remove, handle or otherwise deal with: i) one or more sharing operators; ii) other controlled data; and/or iii) one or more requesting operators. Control level is determined through a combination of the three primary elements of a consent management transaction (i.e., consent management elements): the sharing operator, the controlled data, and the requesting operator. Control levels may be stored in a control data record. Control levels may also have a time dimension. For example, a particular operator may have indefinite read access but may have write access for a limited time.

Control levels may also be stored in a control level data set after the control levels have been associated with controlled data. The control levels will be associated with controlled data based on consent management elements which may be the subject/owner, the sharing operator, the requesting operator, and/or the controlled data. In a scenario, the control level data set may include reference data that represents the consent management elements of a consent management transaction involving controlled data, i.e., who is sharing the controlled data, who is requesting the controlled data, information about the controlled data itself, and/or other circumstances governing access to the controlled data, e.g., a length of time during which the controlled data is accessible to a particular operator.

Referring now to FIG. 1, a system diagram of a data system is shown. Enterprises 100, 150 form a part of the data system. The term "enterprise" may include, but is not limited to, a corporate entity, a government entity, an educational institution, a medical institution, and the like. As an example, medical institution enterprises can be large corporate hospitals or sole practitioner doctor's offices. Enterprises 100, 150 may hold records concerning individual subjects and/or objects. For example, a health insurance company may hold records for each insurance policy holder. In another example, a doctor's office or a hospital may hold records for each of its patients. In another example, a law enforcement agency may hold records concerning individuals that have been arrested, investigated, and/or otherwise been in contact with that agency (e.g. witnesses).

Enterprises 100, 150 may, at times, need to share with other enterprises some portion of the information they store concerning the subjects. However, various statutory, regulatory, ethical, and/or practical limitations may be placed on the kinds of information that may be shared between organizations. For example, the Health Insurance Portability and Accountability Act of 1996 (HIPAA) may limit manner in which a health enterprise can share information. In another example, certain legal and/or ethical rules may prohibit the sharing of certain types of information without express consent of the subject (e.g. mental health records kept by a psychologist; prescription records kept by a pharmacy, and the like).

Practical considerations may also limit the ability of enterprises 100, 150 to share information amongst one another. For example, enterprise 100 may have slightly different personally identifying information as enterprise 150 for the same subject. In particular example, a subject may be identified by enterprise 100 as "Joe A. Smith" with ID 12345. Enterprise 150, however, may identify the subject as "Joseph Smith" with ID A645557. Viewed separately, enterprise 100 and enterprise 150 do not have the ability to reconcile their records to determine whether subjects Joe A. Smith and Joseph Smith are the same person. Therefore, they may be resistant to sharing information concerning the subject to avoid divulging private information about the wrong person. More generally, unless enterprises 100, 150 have some trusted relationship, an individual enterprise has little practical ability to determine the reliability of the information they are receiving from another enterprise. Additionally, a subject who is a patient of a particular doctor may wish to exercise some level of control over whether their doctor shares information, what information the doctor is able to share, and with whom the doctor may share information. To facilitate the sharing of sensitive information between enterprises, the data system may be provided to overcome certain problems and limitations described above.

The data system may include a consent management system (CMS) 102; and consent management repository (CMR) 105. The CMR 105 may be any form of data repository, including a table, a database, and the like. Notably, the data system may, for example, not actually transmit the enterprise data. Rather, the data system may allow the enterprises to share data in accordance with the appropriate statutory, regulatory, ethical, and subject consent requirements.

Actors in the data system include, but are not limited to, subjects, owners, originators, enterprises, employees, consumers, and the like. As explained above, subjects may be the individuals, groups of individuals, or entities who own the records stored by the enterprises and have access control over those records. Alternatively, the subject may be the individuals, groups of individuals, or entities about whom the records refer, and they have legal authority over the sharing of the information, but they are not the owner, nor the operator thereof. In the example shown in FIG. 1, the subject is patient 101, 151. One of skill in the art will recognize that the application of the data system shown in FIG. 1 is broader than the illustrated example of healthcare and may include, for example, law enforcement records, intelligence records, insurance records, banking records, and any other information for which consent management protection is desired.

Owners may be individuals, groups of individuals, or entities that possess the records (i.e. may own the systems which house the records). Originators may be similar to subjects and/or owners in that they may, for example, own the systems that house the records, i.e., both subjects and originators may be information owners in that they can "own" their data and may control the disposition of the controlled data within it. Originators may be the source of the data in the records. Further subjects may have access control over data, but that data is not necessarily about the subject, but may concern other objects (which may be people or things). For example, a law enforcement agency may be an originator and/or a subject/owner of criminal records of individuals the agency is investigating (i.e. the objects of the records). The objects of the criminal records may not have authority to control the disposition of the information in those records, but the law enforcement agency may as the subject/owner of the information.

Operators may be persons within the enterprises and may have varying levels of authority to view, request, and send information. Sharing operators may be persons within an enterprise which are authorized to setup and manage data sharing. In this capacity, sharing operators may be a system administrator who can manually input default reference data values in a control level data set. Control level data values may be entered one by one, or may be entered in bulk, for example, by entering a set of values into a file and submitting the set of values at one time. Alternatively, the system method may be a rules-based automatic system scheme whereby the information stored is controlled at a particular control level because of rule. Finally, requesting operators may be enterprises (or employees of enterprises) that are the recipients of information. Requesting operators may be receiving information from other enterprises or may be receiving information from within the enterprise of which they are a part.

In the example shown in FIG. 1, doctor 103 and laboratory technician 153 may be owners, originators, and/or operators of the subject's data (e.g. be authorized by patient 101, 151 to set and/or update consent management control levels). Enterprises, as described above, may be entities that store, share, and or wish to receive information. In the example of FIG. 1, enterprises 100, 150 may be a doctor's office and a medical laboratory, respectively. One of skill in the art will recognize that the actors involved in a consent management transaction are not limited to healthcare, but may include any other endeavor where control of access to sensitive data is desired.

The example shown in FIG. 1 is of a medical information data system where information is to be shared across two healthcare enterprises 100, 150. The health care enterprises may include a data application 108, for example, a clinical data application, and a data repository or database, for example, clinical data repository (CDR) 106. The patient 101, in this example implementation, is both the subject and the object of the data, meaning the data is about or otherwise concerns the patient who has complete control over the sharing of clinical data in the patient's data record. One of ordinary skill in the art will recognize that this is only an example. The data application 108 may be any application through which an operator may access data stored in the data repository 106, including but not limited to a web portal, a compiled program application, a linked table/spreadsheet, and the like. The implementations described in this document are not limited in this regard.

In enterprise 100, which in the healthcare example may be a hospital, doctor's office, insurance company, and the like, the consent management system (CMS) 120 may include a consent management application 102, user interface (UI) 104, and may be connected to a consent management adapter 110 and a consent management connector 112. The UI may be included in the CMS 120, or it may be integrated into the clinical application 108. As discussed above, CMS 120 can, for example, include consent management repository (CMR) 105. CMS 120 in this embodiment authenticates, verifies, and propagates implied and express consent profiles that provide the consent and authority for requesting operators to receive information. The CMS 120 may be accessible through the UI 104 by an operator/owner with authorization by the subject to change or set the consent control levels for each relationship stored in the CMR 105.

Enterprise 150 includes similar components to those included in enterprise 100. For example, enterprise 150 includes a subject (e.g. patient 151) and an owner/originator/operator 153. In the example shown in FIG. 1, owner/originator/operator 153 is a laboratory technician at a diagnostics laboratory. As explained above, the actors shown in enterprise 150 may vary depending on the circumstances of a particular deployment. Technician 153 has access to data repository 156 through data application 158. Additionally, both patient 151 and technician 153 have access to consent management system 170, consent management application 152, and consent management repository 155 through UI 154. One of skill in the art will recognize that enterprise 100, 150 may include any number of other components and may include some components that have a different configuration as those depicted in the example of FIG. 1.

In the example of FIG. 1, subject 101 and subject 151 may be the same person or may be different people with similar names and/or other information. Similarly, operator 103 and operator 153 may be the same person or may be different people with similar names and/or other information. These identity issues may be resolved through consent management (CM) adapters 110, 160 and CM connectors 112, 162. CM adapters 110, 160 communicate with the CMS 102, 152 and are able to translate the relationships stored in the CMR 105 into data that can be exchanged with the adapter in the other enterprise and understood as a unique new or existing individual whose records are stored in CMR 155. CM Connectors 112, 162 communicate with the data application 108 and allow for information generated by the CM adapters 110, 160 to be transmitted over network 130 through interfaces 114 and 164. Data application 108 may also communicate through interfaces 114 and 164 to allow for transmission of non-consent management related information. All components shown within dotted line boxes 120, 170 are components that may operate collectively as a CMS. These components could be co-located at enterprise 100, 150 or may be accessible via a network or a cloud implementation, e.g. through a local area network ("LAN"), wide area network ("WAN"), the Internet, and the like.

Figure 2:
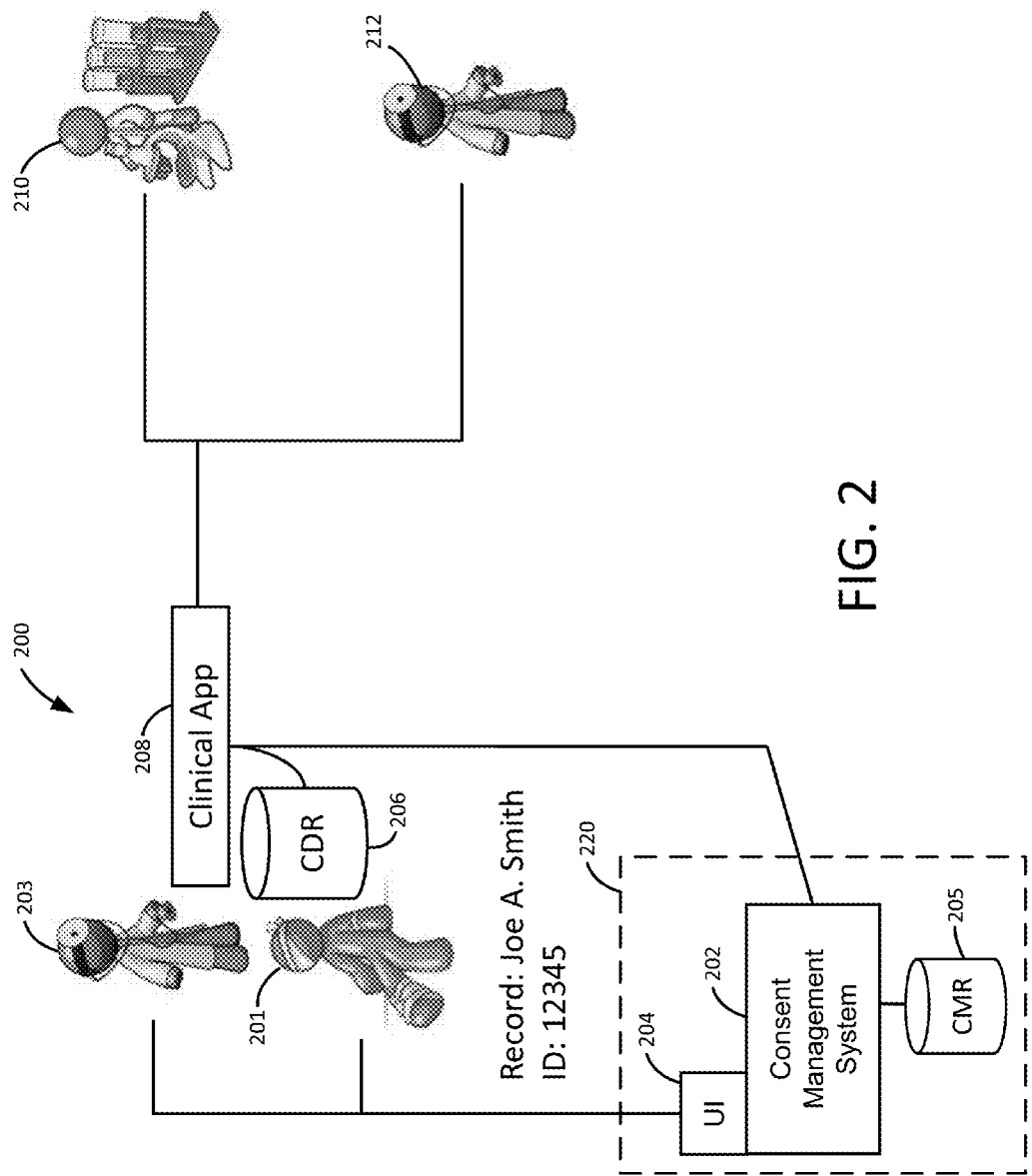
FIG. 2 is system diagram showing an embodiment of a consent management system.

Referring to FIG. 2, an example implementation of a CMS-enabled system 200 is shown. System 200 is an example of a system designed to allow information systems housing sensitive information, e.g. law enforcement data, medical records, financial data, and the like, to instantiate and validate information access controls in a shared data system. Conventional systems may rely upon the enterprise in which the data is resident to implement an access control system to govern access and distribution of information through, for example a document management system. System 200 can be tailored specifically for instances where access control is to be governed by both the enterprise that has control of the information, e.g., a hospital or law enforcement organization, and by external actors. These external actors may not actually be external to the enterprise, but may for example be, from a technical point of view, outside of the normal information control and governance process.

As explained above, these external actors may, for example, be the subject of the information, e.g., a patient, customer, employee, licensee, a law enforcement organization, government organization, and the like, that has allowed access to a piece of information or a record to another organization.

These external actors may seek to have the technical and/or legal means to control the access and distribution of the information that exists about them, or that they provide to a third party because that information may be private and/or sensitive. For example, in one scenario, this data should only be updated by the subject and/or authorized agents of the subject even when the data is outside their sphere of control. The external actors may also seek to define how and with whom the information can be shared or used and/or who can view or change the information.

Certain limited capabilities of consent management have existed in a paper-based format. However, technical and practical limitations of paper-based solutions are challenging because such solutions rely upon the enterprise controlling the information to manage all access control. With system 200, the enterprise may, for example, now be able to give positive and authoritative control to the subject or the originator and allow them to continuously update that control for, by way of example only, changes in the granularity of access controls, and/or changes in the user base that may have access to the information. System 200 may, for example, provide both a taxonomy and a technical framework for the implementation of controls that have long been documented on paper and with grossly oversimplified enterprise access controls.

System 200 may be used for any market. System 200 can be flexible in that the granularity and type of control can be tuned to enterprise requirements. Finally, system 200 may be a reference system in the sense that it can exist above the enterprise systems that rely upon it so that those enterprises can consume the consent management information in order to process the individual information access control transactions.

System 200 may, for example, be supported by use of a public key infrastructure (PKI) to digitally sign the consent management orders. The private key for the enterprise and/or individual can be stored in a secure digital signing repository that is released by the proper user authenticating to that repository locally or remotely and authorizing the secure signing of the document. The public key can be accessible to all consumers of the system 200 to verify a digital signature produced at the time of verification of consent.

System 200 can utilize a taxonomy to define the control of the consent management system (CMS) 220 that is flexible and applicable within the host enterprise (i.e. the entity housing and maintaining the system 200). Each CMS may have a different taxonomy for control of the CMS, but the CMS also makes their taxonomy understandable to those outside the host enterprise. Generally, there may exist a hierarchy of servers for sharing and managing changes across the infrastructure of system 200, as shown for example in FIG. 2

System 200 can provide a centralized management system for verifying consent, while also allowing distributed control of the consent within an enterprise. System 200 may be used to allow subject 201 to manage CMS 220, through UI 204, control level data stored in CM repository 205 and used by consent management application 202 to make consent management decisions based on a set of criteria related to a request for controlled data stored in data repository 206. As an owner, originator, and/or an operator of subject 201's data, doctor 203 also has access, through UI 204 to manage the control levels applied to the subject's controlled data. Other actors 210, 212 may request access to the controlled data. For example, a laboratory technician 210 may request certain records to perform a particular diagnostic test. The request from the technician 210, who may be an operator of a terminal with access to data application 208, is received at the data application 208. Data application 208, in turn, requests a consent management decision from CM application 202. Metadata from the request, such as the identity of who sent the request, identification of the data being requested, the identity of the subject and/or object of the data, and the time at which the request was made, is analyzed and a determination of whether to grant access to the controlled data based on the metadata is made. Similarly doctor 212 may also request access, create, and/or update the protected data belonging to the subject. Although system 200 is shown in FIG. 2 as a medical data management system, the implementation of the disclosed system is not limited in this regard.

Generally the CMS 220 may use any kind of list, data repository, database, and/or directory. One example is to use extensible markup language (XML) to control the CMS. Control may be provided by building a template XML Schema Document (XSD) that informs CMS on the granularity of controls over information the enterprise wishes to achieve.

An administrative interface may directly upload, link, and/or point to the XSD, or it may upload or provide access to another format, e.g., Lightweight Directory Access Protocol (LDAP), X500, comma separated value (CSV), and the like, that may be converted into XML or XSD format.

The core principals of consent management in the CMS may, for example, be broken into two domains: consent management elements and consent management control levels. The first are elements that the enterprise may, for example, control—called the consent management elements. The consent management elements may be defined by the CMS taxonomy and allow an enterprise to set up and redefine the consent management boundaries and framework as it evolves with proper inheritance and change management controls. The second are elements that the subjects, or the originators, may have the ability to control—called the control levels. The control levels define what can be done with the information about the subject or the originator and who provided the authority to do it.

There may, for example, be three core consent management elements in the CMS model. This can be represented in a three-dimensional consent model. The core elements may be defined by the phrase: 1) WHO SHARES; 2) WHAT INFORMATION; 3) WITH WHOM.

WHO SHARES—This may, for example, be the individual or the group, role, sub-group, and the like to which an individual belongs and who specifies the sharing rights of the information. These individuals may be the subject of the information (e.g., patient, customer, employee, citizen) or may be the originator of the information (e.g. law enforcement organization, enterprise, etc.). This element may be a subject, an owner, or an originator. This element may also be a sharing operator.

WHAT INFORMATION—This may, for example, be a record, e.g. the piece of information, data, the class of information, the meta tags of information, the subset of records, and the like that are shared. This element may be a controlled data record and/or controlled data stored in the controlled data record. Additionally, this element may include data concerning a subject (when the object and the subject are the same) or an object (when the subject and the object are different).

WITH WHOM—This may, for example, be the individual or the group, role, sub-group, and the like to which the individual belongs who is provided access to the record and/or is removed from having access to the record. It may be a delineated list of individuals, and/or this element may be a requesting operator.

Figure 3:
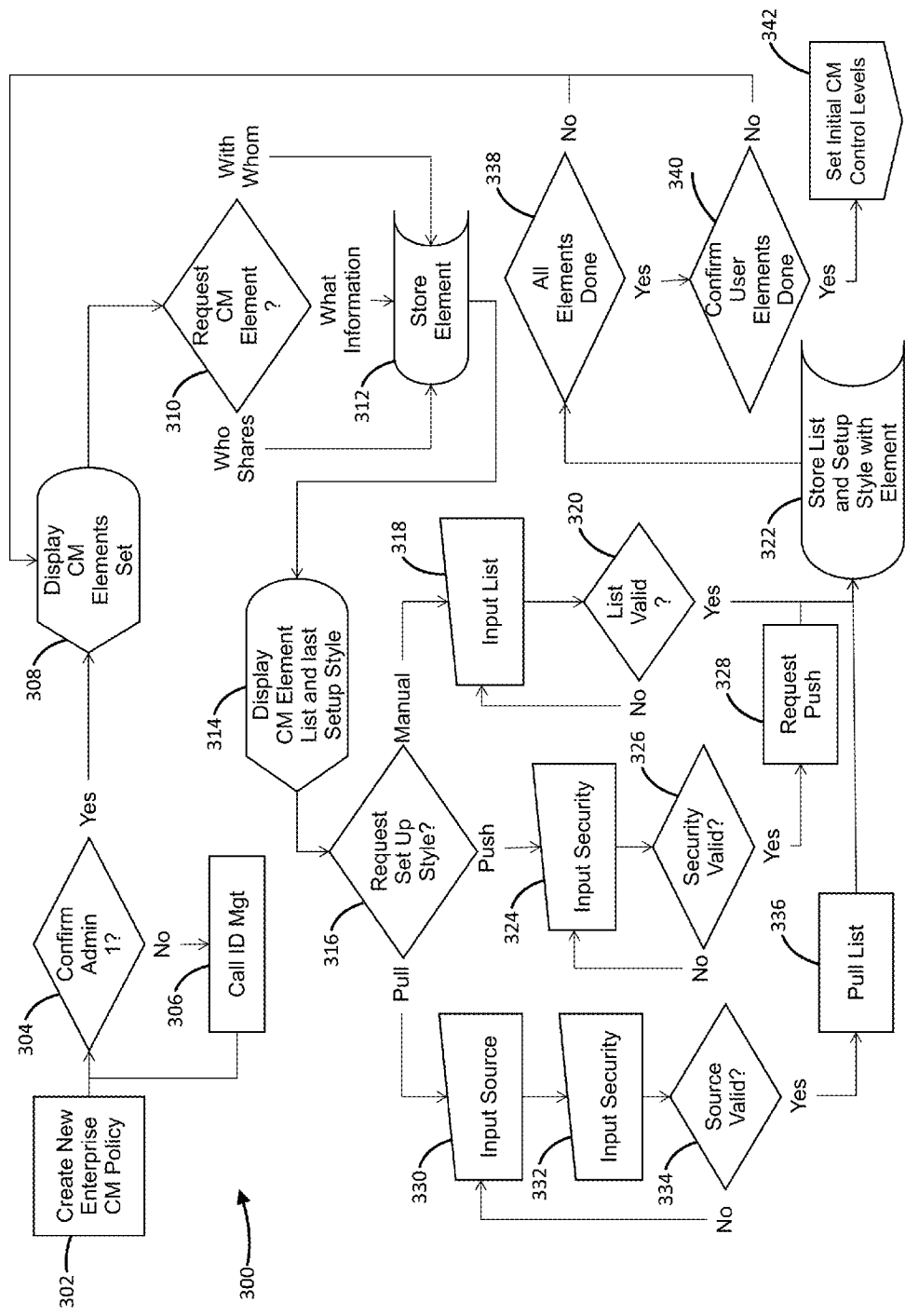
FIG. 3 is a flow chart illustrating a method of creating an exemplary new consent management policy.

Consent management elements may, for example, be preferably expressed as reference data stored in lists of items, such as those shown in FIG. 3. If the list of items becomes so complex that the operator, administrator, and/or subject cannot reasonably ascertain the various groupings and sub-groupings of items within the list, it may become necessary to create a hierarchy or groups of consent management elements to make them easier to manage in larger clusters or search through to find the correct value. This system may be capable of being infinitely embedded and stepped, but for simplicity, only a limited number of these levels have been represented in FIG. 3 as examples. The implementations of the disclosed system are not limited in this regard.

There may, for example, be two core consent properties in the CMS model: implied consent and express consent. They can be the authority that defines whether the consent was provided simply because the individual or organization participates in the business process of the enterprise and therefore implies that they give consent to a set of sharing requirements. The authority could also be an individual or representative that specifies particular information sharing parameters and/or changes the enterprise's default settings by expressing their desires and confirming them with a digital signature.

CMS may include a concept called "authority" that defines who can give the consent. The converse relationship may also occur wherein the authority is the person who can remove, or revoke, the consent. For example, one may operate under implied consent as a rule for being a part of an enterprise, but may have the authority to selectively remove consent for sharing certain pieces of information and sharing with certain individuals and organizations. Consent authority can come from numerous sources. CMS may for example use two types of consent:

The first rule of consent is implied consent which for example can be consent obtained by a person who uses the enterprise systems that depend upon CMS. The user (individual representing themselves or an organization) may be informed that their use of the system, participation with the organization, access to the benefit, and the like, requires that they consent to certain information sharing obligations. This may be similar to the privacy notice found on certain Web sites. Some elements of implied consent may be over-ridden with expressed consent, while others cannot.

Examples of implied consent may include institution consent, business process consent, administrative consent, emergency consent, law enforcement consent, and the like. Institution consent can be implied through a subject's interaction with an institution and notification thereof. Business process consent can be implied through a subject's participation in a business process within an institution or between institutions. Administrative consent can be implied through a subject's interaction with an organization. An individual may be required for administrative purposes to share certain elements of information due to legal or audit requirements with any notification. With institution, business process, and administrative consent, the subject's interactions may be giving implied consent to participate in information sharing. Additionally, institution, business process, and administrative consent generally may be freely revoked by electing to no longer participate with the institution, business process, or agency.

Other examples of implied consent may be through operation of law and may not be freely revocable. For example, emergency consent may be implied through a subject's interaction with an entity or organization in an emergency situation. There are instances in which other organizations can invoke emergency authorities to get access to information under a "break the glass" emergency situation. Law enforcement consent is implied through a subject's interaction with a law enforcement organization. There may be an implied consent that the information can be shared between law enforcement organizations in accordance with regulatory requirements and/or with proper legal authority. Emergency and law enforcement consent is rarely revocable.

Some elements of implied consent may be over-ridden with expressed consent, while others cannot. For example, one may have to give implied consent to share medical billing data within a hospital to get care from that hospital; typically this kind of implied consent cannot be revoked as long as the individual is interacting with the hospital or hospital staff. At the same time, the individual can opt out of sharing particular information, e.g., behavioral health information, with all practitioners in the hospitals.

The second rule of consent is expressed consent may be consent wherein the individual specifically provides consent for the sharing of information. Conversely, expressed consent may also refer, for example, to the concept that the person can remove or convert some or all of implied consent through express action. Individual expressed consent occurs, for example, when an individual human being expressly grants or denies consent for an action. Enterprise expressed consent occurs, for example, when an enterprise desires to control information about itself. Typically, an individual or group of individuals (e.g. a board or committee) can be given the authority to act on behalf of an enterprise to control its consent properties for information it has originated or information about the enterprise.

In other exemplary situations, an individual may have the authority to grant or deny expressed consent on behalf of another individual. For example, a parent may provide expressed consent concerning actions involving their child. Parental consent may require that the child's identity and records are associated with those of the parent. In the medical context, this may occur when the children present themselves for care, usually in the presence of the parent. In addition, legal jurisdictions have differing rules for how the records of minors are protected, and which records are protected at what age. Therefore, parental consent may require regulatory controls either requiring parental consent for some records and/or limiting the scope of parental consent for some records. Similar to parental consent authority over a child, legal guardianship may also need to be verified. This requirement will vary between jurisdictions. An example of a default consent provision may be that if the person is authorized to drive the child to the medical facility and enroll them, they are also probably authorized to control their consent management control levels.

There may also be situations not involving children when an individual may have authority to grant and deny express consent for another individual. For example, an individual (e.g. an adult) may give proxy authority to another individual, e.g. a spouse or an adult child, to help with their medical affairs. Proxy consent authority may not be due to temporary or permanent impairment, but may instead be used for convenience of the individual. In other situations, the individual may be suffering from a temporary or permanent impairment that would prevent their ability to make a proper decision. A spouse, adult child, parent, or other designated authority may have the ability to act on an individual's behalf. Similarly, emergency authority may exist, commonly referred to as a "break the glass" functionality, in which an emergency has occurred and there exists a need to gain access to a record without proper consent. In such a case, the information element may have to be deemed part of the "break the glass" set. If accessed, the reason for accessing and notification of the record subject or originator may be required.

Implied consent may be signed by the enterprise using the enterprise's private key. The use of this digital signature can mean that the enterprise accepts liability for the sharing of information under the implied consent rules that they have posted. When the policies, information elements, technical means, or sharing practices change, they may have agreed that they have notified their user base covered under the implied consent model that the change has been made.

Express consent may be signed by the subject using the subject's private key. The use of this digital signature can mean that the user is who they claim to be and that the user accepts liability for sharing the information under the expressed consent rules that they have authorized.

The CMS can, for example, record multiple levels of consent, or control levels. These control levels may include, but are not limited to: create (i.e., the consent to create new information about an individual); read existence (i.e., the ability of the individual to discover the existence of information in the enterprise—this does not provide access to the information, but allows or prevents those searching for information to know if it exists); read data (i.e., the ability to read information about an individual without the authority to retain the information); retain (i.e., the ability to read and retain information about an individual similar to a copy command); update (i.e., the ability to provide new data and information about an individual—the old information must still be retained by the originating organization under existing data retention rules); and delete (i.e., the ability to remove data and information about an individual). Delete controls may typically be limited to administrative functions that are relevant in situations where records were improperly associated with an individual. The old information may remain associated with the individual, e.g., for historical and/or audit purposes. Additionally, a "retain for" control may be defined wherein a person can give the retain control, as described above, but that expires requiring the receiving enterprise to delete the information.

The CMS may also have a number of security features. For example, any administrative change to the platform may require two-person control, i.e., there are at least two administrators with two different roles (e.g., administrator and supervisor) who have to implement and authorize a change to the system. In another example, any user change to the platform may require the user to sign in to the enterprise standards for authentication. To make user changes legally binding, the user may be required to complete a two-factor authentication of their identity (and the implied identity proofing required to set up such an identity). Changes to consent management elements may also be restricted to originate only from enterprise authorized sources (e.g., by IP address, by certificate, by directory, and the like). The administrative and user interfaces to the CMS may be web-based, for example. In this scenario, web-based administrative and user interfaces may be secured with various different encryption schemes known in the art. In this scenario, all web services accessed by the administrator, the user, the consumer or their associated systems may establish trust through the exchange of a CMS certificate designated that business purpose.

To operate a CMS, there may be at least one information-sharing group that agrees to share information within a specified format and under a specified set of rules. This information, and the classification, grouping, tagging, etc. thereof may provide the backbone of WHAT INFORMATION. This information may also provide the some or all of the substance behind the WHO SHARES. This CMS may be as complex as a national network for law enforcement information sharing or health information sharing. Alternatively, it may still be large in scope, but simple in use, like a large-scale social network for sharing media or intellectual property (e.g. Facebook, YouTube, LinkedIn, etc.). Alternatively, it could even be a very small network that seeks to share information like a family photo sharing or legal/financial record sharing implementation. The scenarios described in this document are not limited in this regard.

In a scenario, there may be a document management system (for example application 208 of FIG. 2) of the information to be shared with the authorized operators in the network. Authorized operators may be producers of information (i.e., originators), subjects of information, or users of information. The network may also have operators that may participate and/or view records in the CMS but do not have specific authorization to make alterations or changes. These users are "public" users and fill a public role. The CMS may recognize these users by role and make access decisions based on control levels assigned to the role rather than to the individual operators.

To operate the CMS according to some scenarios, there may be at least one list of authorized operators. This list of authorized operators may provide the backbone for the WITH WHOM, but it also could be part of the information set that established some of the WHO SHARES. In other words, the authorized operators may represent the universe of operators, originators, and/or subjects that share information and/or the universe of information users (e.g. service providers, law enforcement personnel, and the like) to whom the information is shared.

For example, there may be authorized users within the enterprise, and those outside of the enterprise. If one is defining sharing rules within the enterprise where the records are help, the enterprise may have ready access to the directory of authorized users for that enterprise for the WITH WHOM.

If, for example, one may preferably be going to govern by saying that they want to share with anybody in an enterprise, the published list could include the universe of the enterprises. Similarly, if the level or granularity may be restricted to particular groups and/or individuals within an enterprise, the published list could include the universe of groups and/or individuals within the enterprise.

The CMS may also have administrative functions. For example, an administrative operator may be able to log in to an administrative control panel. In some scenarios, there may be multiple administrative roles. The administrative control panel may be able to leverage both an Identity Management System (IDMS) as well as any Security Assertion Markup Language (SAML) assertion with proper role breakdown.

Referring now to FIG. 3, an example process 300 for creating a new enterprise consent management (CM) policy is shown. Policy may be an enterprise wide rule that states that operators have certain rights, such as implied consent. A new CM policy can be created using the administrative control panel 302. First, it may be determined whether the user has administrative rights to the control panel 304. If not (304: No), the user may be referred to ID management 306. If administrative rights are found (304: Yes), the CM elements set is displayed 308. As described above, the CM elements are WHO SHARES; WHAT INFORMATION; and WITH WHOM. The CM element is requested 310, and the appropriate CM elements are gathered and stored 312. After the element is stored, the CM element list and last setup style is displayed 314. The CM set up style is then requested 316.

At this point, an administrator can be able to choose from a number of set up styles. For example, manual data entry may be selected (316: Manual) wherein the list of attributes that will be used to govern consent management is relatively small. As such, the administrator may simply type in the values that will be used to control the consent management process directly into the configuration website 318. In another example, an administrator may upload a comma or tab delimited list in the proper format. This format may be standardized and easy to submit. The administrator may configure the files properly for each one of the axes and then upload when they are informed that they should do so. The list may then be checked for validity 320, if valid (320: Yes), the list may be stored with the element as a manual input list 322. If the list is not valid (320: No), the administrator is returned to the input screen for re-input of the list 318.

In another example, push (316: Push) can enable the enterprise to push the values to a targeted web service end point inside the enterprise, e.g. on an adapter, or outside the enterprise, e.g. cloud storage. This process can provide security for the inbound packet as well as an authentication and handshake process to ensure that the command can only come from an authoritative source 324. The validity of the security can be checked 326, and if valid (326: Yes), the push is requested 328 and the list is stored as a push input list 322. If the security is not valid (326: No), the administrator can be returned to the security input screen for re-input of the security 324.

In another example, pull (316: Pull) can enable an enterprise to provide updated information for the application stack for content management adding web services in point at any point in time in the process. This process can, for example, provide a source and security for an inbound packet as well as an authentication and handshake process to ensure that the source is valid. As such, the enterprise's desired axis values can actually be updated on servers and the data retrieved from its location when a change is needed. A source, i.e., the location from which the element is to be pulled, can be entered into the pull input screen by the administrator 330. Security can be entered to authenticate the source and/or the data being pulled 332. If the source is valid (334: Yes), the list may be pulled 336, and the list may be stored as a pull input list 322. If the source is not valid (334: No), the administrator can be returned to the source input screen for re-input of the source 330.

Regardless of how the information is received, after it is stored, the administrative control panel can, for example, determine whether all elements are done 338. If not (338: No), the administrator can be returned to the display of CM elements set 308. If all elements are done (338: Yes), the user can be asked to confirm that all elements are done 340. If not confirmed (340: No), the user may be returned to the display of CM elements set 308. If confirmed (340: Yes), the user is asked to set initial CM control levels as described below in relation to FIG. 4.

The file type for the push and pull processes may vary depending upon the consent management element. For example, referring to the consent management element of "WHO SHARES", the enterprise may point CMS to a directory of all operators, subjects, and/or originators listed in the system. This directory may have all subjects or originators listed explicitly, and it may also include the groupings of the operators, subjects, and/or originators that may discriminate their roles or authorities. For the consent management element of "WHAT INFORMATION", the enterprise may point CMS to an XML or other file that lists all of the information tags used to categorize the types of information that are indicated within the organization. For the consent management element of "WITH WHOM", the enterprise may point CMS to a directory of all the users listed explicitly, and it would also include the groupings of the users that would discriminate roles or authorities of the users of the system.

Figure 4:
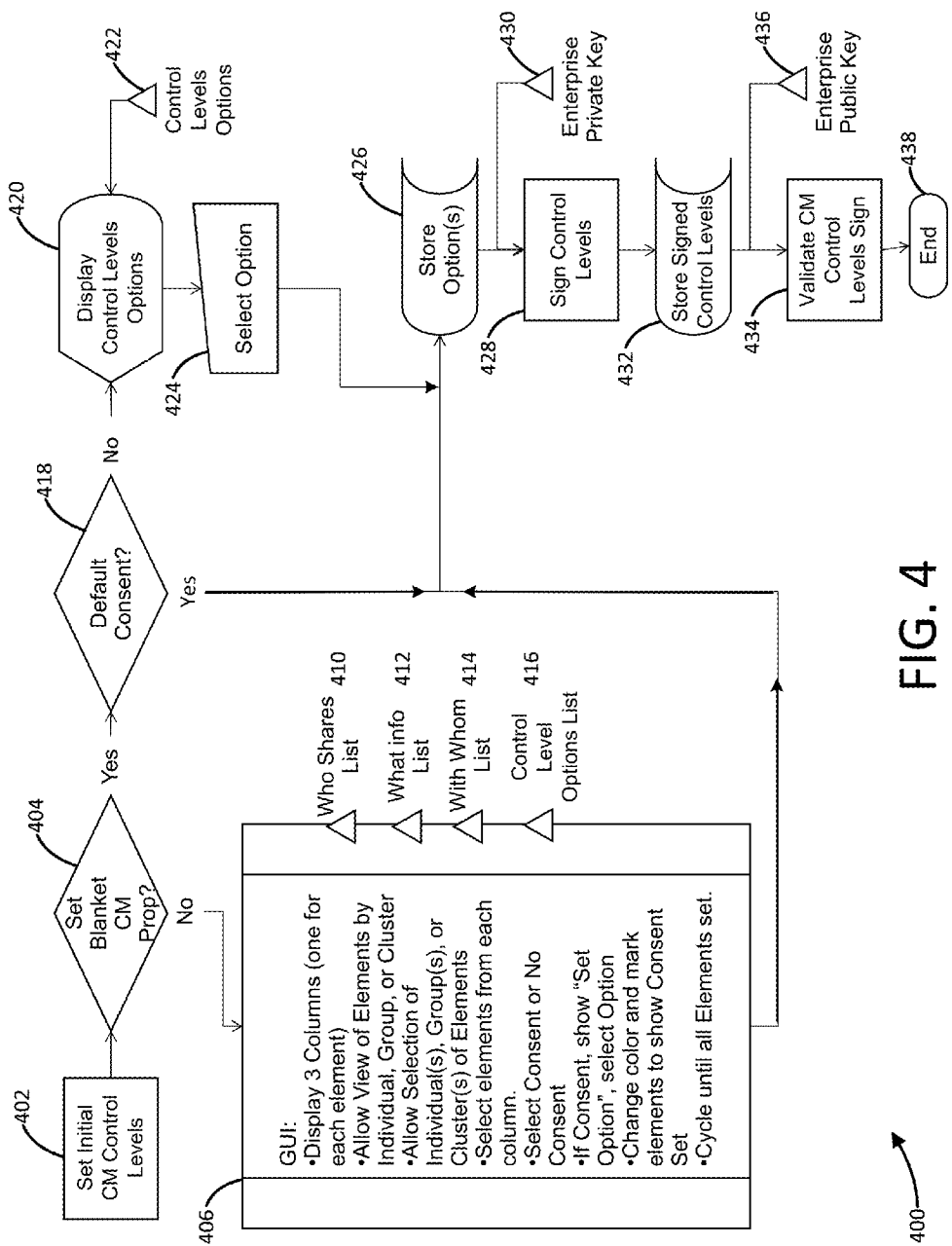
FIG. 4 is a flow chart illustrating an exemplary method of setting initial consent management control levels.

Referring now to FIG. 4, exemplary process 400 may continue the process 300 and allow an administrator to set initial CM control levels 402. The administrator may either select blanket CM control levels for all CM elements or individually set each CM control level for each CM element or group of elements 404. If blanket CM control levels are not selected (404: No) the control levels for each element can be selected from control level options graphical user interface (GUI) 406. In GUI 406, three lists of reference data may be displayed, one for each consent management element. As shown in FIG. 4, reference data lists 410, 412, 414 may be shown. Elements may be viewable by individual element, group, or cluster. Additionally, selection of elements may be allowable by individual(s), group(s), or cluster(s). The user may select elements from each column and select the control level for each element. Additionally, the user may select a time limit on the access granted by the selected control level. For example, a user may select an option shown for that element from control level options list 416. Consent is then set and GUI 406 cycles for all elements and the controls are stored 426. After being stored, the CM control levels can be digitally signed 428 using enterprise private key 430. The signed options can be stored 432 and validated 434 using enterprise public key 436. The CM set up process then may end or other processing performed 438.

If blanket CM control levels are selected (404: Yes), the user may, for example, select whether to select default consent 418. If default consent is not selected (418: No), the control levels options 422 can be shown 420. The control levels can be selected 424 and the options stored 426. After being stored, the CM control levels can be digitally signed 428 using enterprise private key 430. The signed options can be stored 432 and validated 434 using enterprise public key 436. The CM set up process then can end or other processing performed 438. If default consent is selected (418: Yes), the default options can be stored 426 and the process can continue as described above.

Change management can be an important aspect of the CMS. It is through change management that the enterprise may be able to define the inheritance rights of consent based upon changes in information designations, user rights, and authorities on both the subject/originator side and the end-user side. For example, an enterprise may designate one or two meta-tags or groupings for all of its information. Subsequently, the enterprise may decide to expand its information classifications to comply with legal guidance. This compliance effort may be at a national level or at a local/regional level. As such the enterprise then may, for example, only need the capability to refine the consent management roles and inherit the prior controls and authorities without significant investments in retagging the information or changing the information base.

Figure 5:
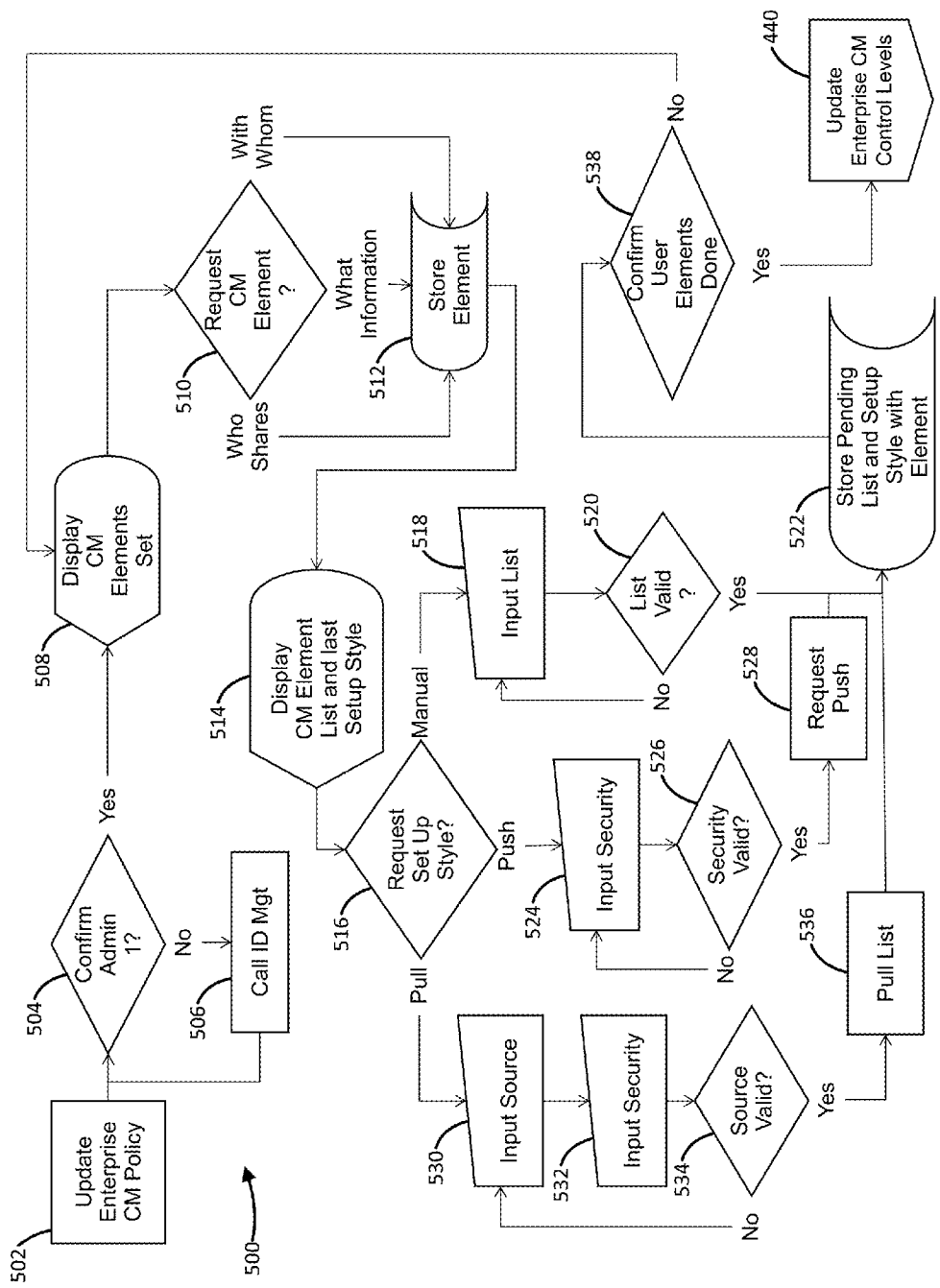
FIG. 5 is a flow chart illustrating an embodiment of a method of updating consent management policy.

After loading an initial set of consent management elements and associating appropriate control levels to those elements, an administrator may update the consent management elements and/or control levels at any point. Referring now to FIG. 5, an example process 500 for updating consent management policies is shown. A consent management (CM) policy may include default associations for individual consent management elements or may be enterprise wide policies which require certain control levels be assigned to particular elements. For example, a hospital may require that all doctors have read access to the controlled information belonging to any patient of the hospital. This is essentially an imposition of "implied consent" to allow read access for all doctors by the patient simply by choosing to be treated at that hospital.

The process is substantially similar to that illustrated in FIG. 3. A CM policy can be updated using the administrative control panel 502. First, it is determined whether the user has administrative rights to the control panel 504. If not (504: No), the user is referred to ID management 506. If administrative rights are found (504: Yes), the CM elements set is displayed 508. As described above, the CM elements are WHO SHARES; WHAT INFORMATION; and WITH WHOM. The CM element is requested 510, and the appropriate CM elements are gathered and stored 512. After the element is stored, the CM element list and last setup style is displayed 514. The CM set up style is then requested 516.

At this point, an administrator may be able to choose from a number of set up styles. For example, manual data entry may be selected (516: Manual) wherein the list of attributes that will be used to govern consent management is relatively small. As such, the administrator may simply type in the values that will be used to control the consent management process directly into the configuration website 518. In another example, an administrator may upload a comma or tab delimited list in the proper format. This format may be standardized and easy to submit. The administrator may configure the files properly for each one of the axes and then upload when they are informed that they should do so. The list may then be checked for validity 520, if valid (520: Yes), the list may be stored with the element as a pending manual input list 522. If the list is not valid (520: No), the administrator is returned to the input screen for re-input of the list 518.

In another example, push (516: Push) may enable the enterprise to push the values to a targeted web service end point inside the enterprise, e.g. on an adapter, or outside the enterprise, e.g. cloud storage. This process can provide security for the inbound packet as well as an authentication and handshake process to ensure that the command can only come from an authoritative source 524. The validity of the security can be checked 526, and if valid (526: Yes), the push is requested 528 and the list is stored as a pending push input list 522. If the security is not valid (526: No), the administrator is returned to the security input screen for re-input of the security 524.

In another example, pull (516: Pull) can enable an enterprise to provide updated information for the application stack for content management adding web services in point at any point in time in the process. This process can provide a source and security for an inbound packet as well as an authentication and handshake process to ensure that the source is valid. As such, the enterprise's desired axis values can actually be updated on servers and the data retrieved from its location when a change is needed. A source, i.e., the location from which the element is to be pulled, can be entered into the pull input screen by the administrator 530. Security can be entered to authenticate the source and/or the data being pulled 532. If the source is valid (534: Yes), the list may be pulled 536, and the list may be stored as a pending pull input list 522. If the source is not valid (534: No), the administrator may be returned to the source input screen for re-input of the source 530.

Regardless of how the information is received, after it is stored, the administrative control panel can determine whether all elements are done 538. If not (538: No), the administrator can be returned to the display of CM elements set 508. If all elements are done (538: Yes), the CM control levels can be updated 540 as explained below in reference to FIG. 6.

When the consent management elements are updated, the administrator may desire a mechanism to designate how the new consent management elements interleave with the old consent management elements. The CMS can in certain embodiments provide the taxonomy for such change management.

For example, the CMS can represent the change management as both a GUI-based change management tool as well as a scripting language-based change management tool. Further, as the scripting language-based change management tool is implemented, the administrator may, for example, have the ability to render the change management view in the GUI to visually validate the accuracy of the scripting.

Figure 6:
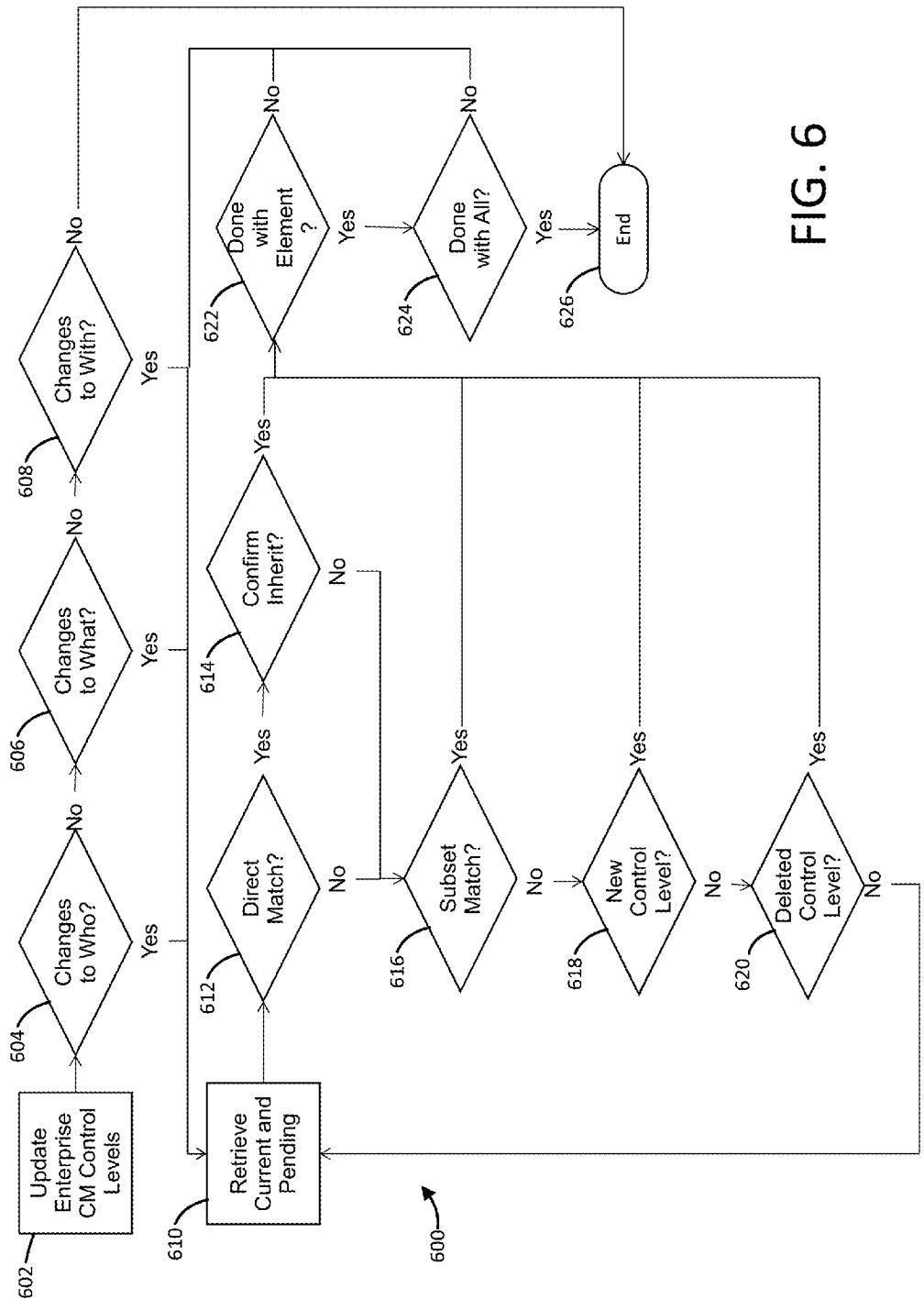
FIG. 6 is a flow chart illustrating an aspect of a method of updating consent management control levels.

The generalized case for change management on CMS may, for example, compare the existing list for consent management elements with the proposed new list of consent management elements. Referring to FIG. 6, an example process 600 for updating enterprise CM control levels is shown. Enterprise CM control levels can be updated through an administrative control pane 602. Changes to WHO SHARES 604, WHAT INFORMATION 606, and WITH WHOM 608 are selected. If no changes are made, process 600 ends or other processing is performed 626. If any one or more of WHO SHARES 604, WHAT INFORMATION 606, and WITH WHOM 608 is to be changed (604, 606, 608: yes), current and pending elements lists are retrieved 610. Each current element is then compared with each pending element and is identified as a direct match 612, a subset match 616, a new control level 618, or a deleted control level 620. If the control level is identified as a direct match (612: Yes), it is confirmed whether to inherit the control levels from the previous element 614. If so (614: Yes), the user confirms whether they are done with the element 622 and if so (622: Yes), whether they are done with all elements 624. If not (622,624: No), the process 600 returns to the element list 610 and the next element is identified.

If the control level is not identified as a direct match (612: No) or if the control levels are not inherited from the previous element (614: No), then the system determines if the control level is a subset match 616. If the control level is not identified as a subset match (616: No), it is determined if it is a new item 618. If the control level is not identified as a new item (618: No) then it is determined if the control level is a deleted item 620. If the control level is not determined to be a deleted item (620: No), then the process returns to the next current and pending control level and restarts at step 612. If the control level is a subset match, a new item, or a deleted item, and the user is not done with all elements (624: No), then the process returns to step 610. If the user is done with all elements (624: Yes) the process ends or other processing is performed 626.

Process 600 may, for example, allow the administrator, either through the GUI or through the scripting language, to designate one of a plurality of inheritance cases Inheritance cases may include the following. "Replace Same" can be used when the original consent management element is replaced with the exact same consent management element. "Replace New" is used when the original consent management element is replaced with a new consent management element that is exactly the same and scope but only has a change in name. "Subdivide" is used when the original consent management element is divided into two or more sub elements and inherits directly the control levels from the original element. "Delete" is used when the original consent management element is no longer used and may be deleted from the list of possible consent management elements. "New" is used when we need to add a new value to the original consent management list and new set of consent rules and control levels need to be applied. Each of these cases results in very unique behaviors of the consent management workflow and these behaviors also result in changes that are dependent upon which of the content management elements we are changing.

Figure 7:
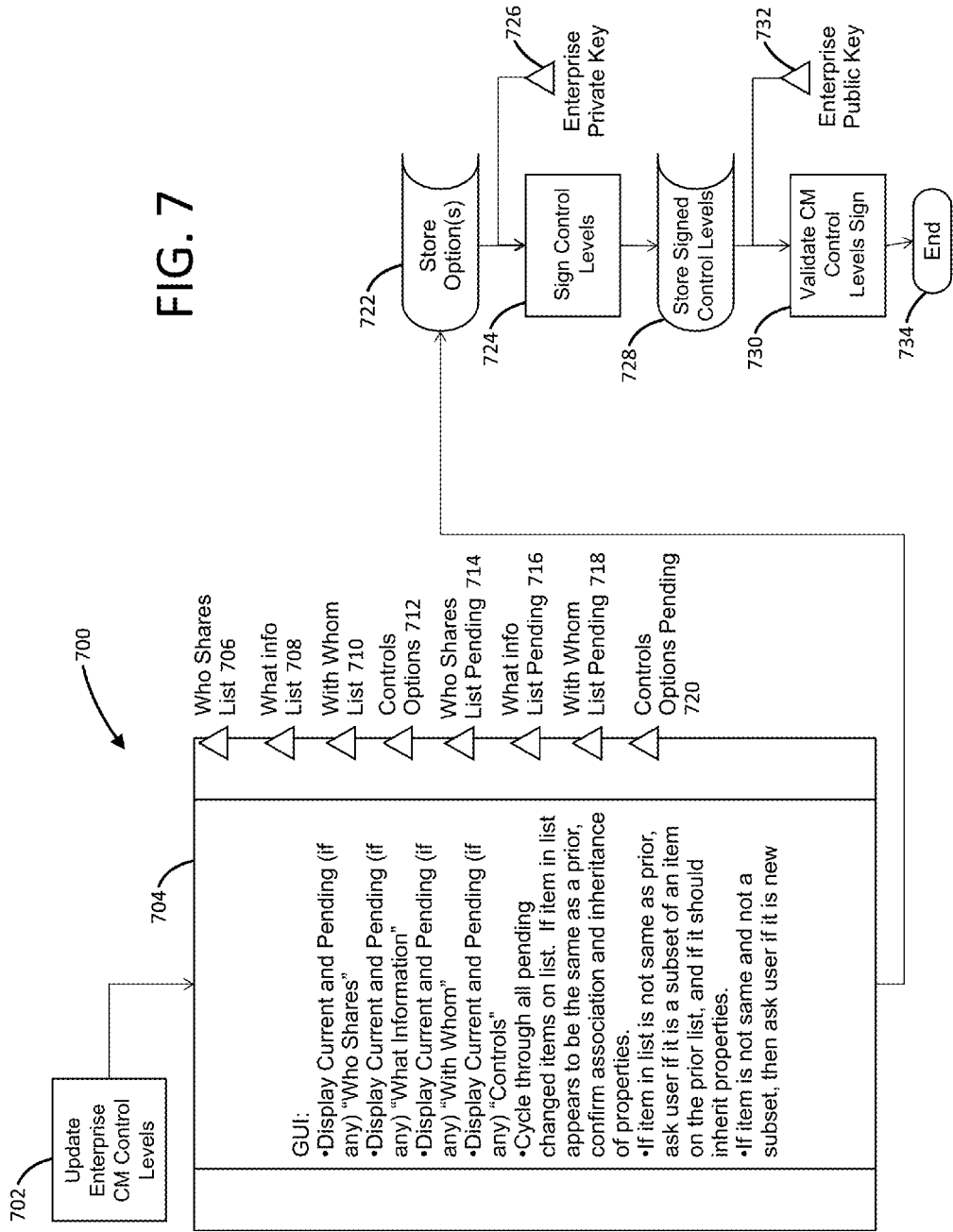
FIG. 7 is a flow chart illustrating an aspect of a method of updating consent management control levels.

Referring now to FIG. 7, exemplary process 700 can continue the process 500 and allow an administrator to update CM control levels 702. The administrator may select the control levels for each element from GUI 704. In GUI 704, current and pending (if any) WHO SHARES elements 706 are displayed, as are those for WHAT INFORMATION 708, WITH WHOM 710, and controls 712. All pending changed items on the pending lists 714, 716, 718, 720 are cycled through and if an item in the list appears to be the same as a prior, confirm association and inheritance of control levels. If an item in the list is not the same as a prior, ask user if it is a subset of an item on the prior list, and if it should inherit control levels. If an item is not the same and not a subset, then ask user if it is new. This process is similar to that shown in steps 612 through 620 of FIG. 6. GUI 704 cycles for all elements and the controls are stored 722. After being stored, the CM control levels are digitally signed 724 using enterprise private key 726. The signed options are stored 728 and validated 730 using enterprise public key 732. The CM set up process then ends or other processing is performed 734.

In one exemplary scenario, an enterprise may wish to transform from role or group tracking to individual tracking. The enterprise may have previously tracked roles or groups of people using implied consent. For example, when administrators set the system up, individuals can be grouped into groups called "Patients" and "Operators". In this scenario, the enterprise may desire to transition to personal mandates where the subjects control their own information dissemination. Instead of a group called "Patients," the WHO SHARES list will now be the actual names (and other attributes that make them unique, e.g., patient ID) of the patients. To do so, the enterprise may assign each individual to a role or group that allows for the inheritance of the prior consent. The enterprise previously used implied consent as part of the implementation to test consent management. Once the patients are listed individually, administrators then have the flexibility to set implied consent as the default for each patient. Therefore, each patient, individually, can perform their unique consent management transaction to change the consent from implied to express.

A number of non-limiting examples illustrate how this process may proceed. In one example, an administrator may wish to add an individual. A subject (like a patient, customer, or citizen) who does not exist in the current WHO SHARES list may be added. While there is a presumption that a record about them exists in the WHAT INFORMATION list, that record does not yet need to exist. In the event no such record exists, the user will inherit the default consent management implementation for each WHAT INFORMATION element in the enterprise list until that individual changes the control levels for that element. In another example, an administrator may wish to delete an individual. In this example, a subject (like a patient, customer, or citizen) who previously existed in the WHO SHARES list will be removed. In a scenario, the individual's record does not exist in the WHAT INFORMATION repository (i.e., is deleted prior to the removal of the individual from the WHO SHARES list) before the WHO SHARES element can be deleted. In an alternative scenario, the individual's record in the WHAT INFORMATION repository and the WHO SHARES list may be deleted simultaneously, with proper safeguards to ensure against inadvertent or improper deletion. Note that this deletion of an individual may, for example, only delete the relationship between the data elements, but not delete the date itself, which may be archived for historical and audit purposes.

Changes to the WITH WHOM list can be handled similarly to those described above with respect to the WHO SHARES list.

Administrators may wish to update the WHAT INFORMATION repository. For example, they may wish to change an element name. When an information element seeks to change names it may inherit all of the prior consent management control levels, but the boundaries and scope of the element are the same. For example, "Mental Health Information" may have been previously listed behavioral health information. The enterprise may find that it would be more appropriate to call it "Behavioral Health Information". This may require the tags on the information itself to change at the same time that the consent management system element changes. The trail of both names may need to be valid during the duration of the change as well as any time-to-live (TTL) while propagating that change across all of the consent management repositories. This may be achieved by setting a time of effective change, thereby synchronizing the change across information repositories as well as consent management control level stores.

In another example, an administrator may wish to increase element granularity. An information element may be subdivided into two or more information elements. As an example, the information element "Medical Information" could be subdivided into "Medical Billing and Administration Information" and "Health Information". When that division occurs, two activities may need to happen. First, the new, more granular information elements may inherit all of the consent management control levels of the less granular consent management element that they are replacing. Second, the less granular and the more granular may need to be valid during the duration of the change as well as any TTL while propagating that change across all of the consent management repositories. This could be achieved by, for example, setting a time of effective change, thereby synchronizing the change across information repositories as well as consent management control level stores.

In another example, the administrators may wish to add a new element. In this example, a new information element is added to the list of information elements. It may receive a new default set of consent management control levels. Subsequently, these control levels can be updated under the policies of the enterprise. In another example, the administrators may wish to delete an old element. An information element that has been in use previously may be deleted by first ensuring that all remnants of the information element are removed from the information repository (e.g., tags, groups, etc.). Then, once the enterprise confirms that it is removed, then the list is updated to remove the old element. As with the removal of individuals from the WHO SHARES list, the information in the WHAT INFORMATION repository may not be deleted permanently. In some scenarios, the relationships between the individuals and the data in the repository may be removed, but the data itself remains for historical and audit purposes.

When the administrator creates a new element, whether that element is WHO SHARES, WHAT INFORMATION, or WITH WHOM, the administrator may preferably chose to set the default consent management control levels based upon the element type, the policies and procedures of the enterprise, and the like. For example, default settings may be classified by the new type of element. In one scenario, the administrator creates a new WHO SHARES element. The new individual, group, role, or organization in the WHO SHARES element may cause the new list item to inherit the default consent management control levels for WHAT INFORMATION and WITH WHOM for the enterprise. In another scenario, the administrator creates a new WHAT INFORMATION element. A new tag, grouping, or cluster of information in the WHAT INFORMATION element can cause all WHO SHARES items to inherit the default consent management control levels for the enterprise for that WHAT INFORMATION element and the associated WITH WHOM elements for the enterprise. In another scenario, the administrator creates a new WITH WHOM element. A new individual, group, role, or organization in the WITH WHOM element can cause all WHO SHARES items to inherit the default consent management control levels for the enterprise for that WHAT INFORMATION element and WITH WHOM for the enterprise.

In addition to setting the default control levels based upon the rules across the elements, the administrator may also be able to establish whether or not the consent management control level is allowed to be modified by the WHO SHARES elements or not. In one scenario, an enterprise may set default values which force users to adopt predefined sharing requirements to be part of the enterprise These requirements, therefore, may for example not be changed. The enterprise administrator will have the flexibility to modify whether or not the consent may be changed and whether the consent Controls and Authority may be changed, and by whom.

A user can, for example, access the CMS through multiple vectors in certain embodiments. Non-limiting examples of potential engagement vectors may include enterprise invitation to configure consent management; practitioner request to distribute to another party; and/or third party request to gain access. The scenarios described in this document are not limited in this regard.

In an exemplary scenario, when a user arrives at the CMS User Control Panel, the user enters their identity for the enterprise (this could be resolved using the IDMS to a single identity or IXP to a common identity). The user may then be presented with all of the organizations for which they have consent management control levels. If they have entered the identity for one and only one enterprise, they may, for example, only see the control levels for that enterprise. If they use the IDMS identity, or have correlated that enterprise identity with other enterprise identities, then their consent management control levels from all associated enterprises may be visible.

The user may then, for example, select the enterprise for which they would like to see the control levels (and potentially change). The user can be presented the current consent management control levels by information elements and obtain data pertaining to how each consent management control level was instantiated (what Control and by what Authority).

The user may then select a consent management control level they would like to change. They can be shown the current control level and who signed that control level to show who instantiated the control level. They may, for example, make the modification (of the Control and the Authority), and then they may be asked to digitally sign that modification. For example, a user may want to allow people to discover that the user has a behavioral health record, so the user implements a "Read Existence Control" that prevents those who do not have explicit consent to see the existence of their behavioral health record from even seeing if one exists unless given explicit consent from the end user. In another example, a law enforcement or intelligence organization may provide consent to determine if information exists on a certain subject by default (implied consent), but then may only allow sharing certain elements with certain other law enforcement organizations who demonstrate a bona fide need (e.g., because it might be from a case in process).

In the healthcare context, a healthcare enterprise may establish rules that require users of their system to give implied consent to share general health information with all enterprise members as well as all Nationwide Health Information Network (NwHIN) (eHealth Exchange members). In one example, through implied consent, the enterprise practitioners may have read data and create controls, while NwHIN users have read existence or read data controls. The user may provide explicit consent to sharing non-general information (behavioral health, reproductive health, etc.) within enterprise and across NwHIN and may also provide consent for create controls for NwHIN participant to send new lab results to the enterprise.

In another example, a law enforcement organization may provide implied consent for sharing post adjudicatory information, but explicit consent for sharing case information prior to adjudication. In the case prior to adjudication, the subject of the information (or the originator) can then define who has consent to access their records before the adjudication.

Figure 8:
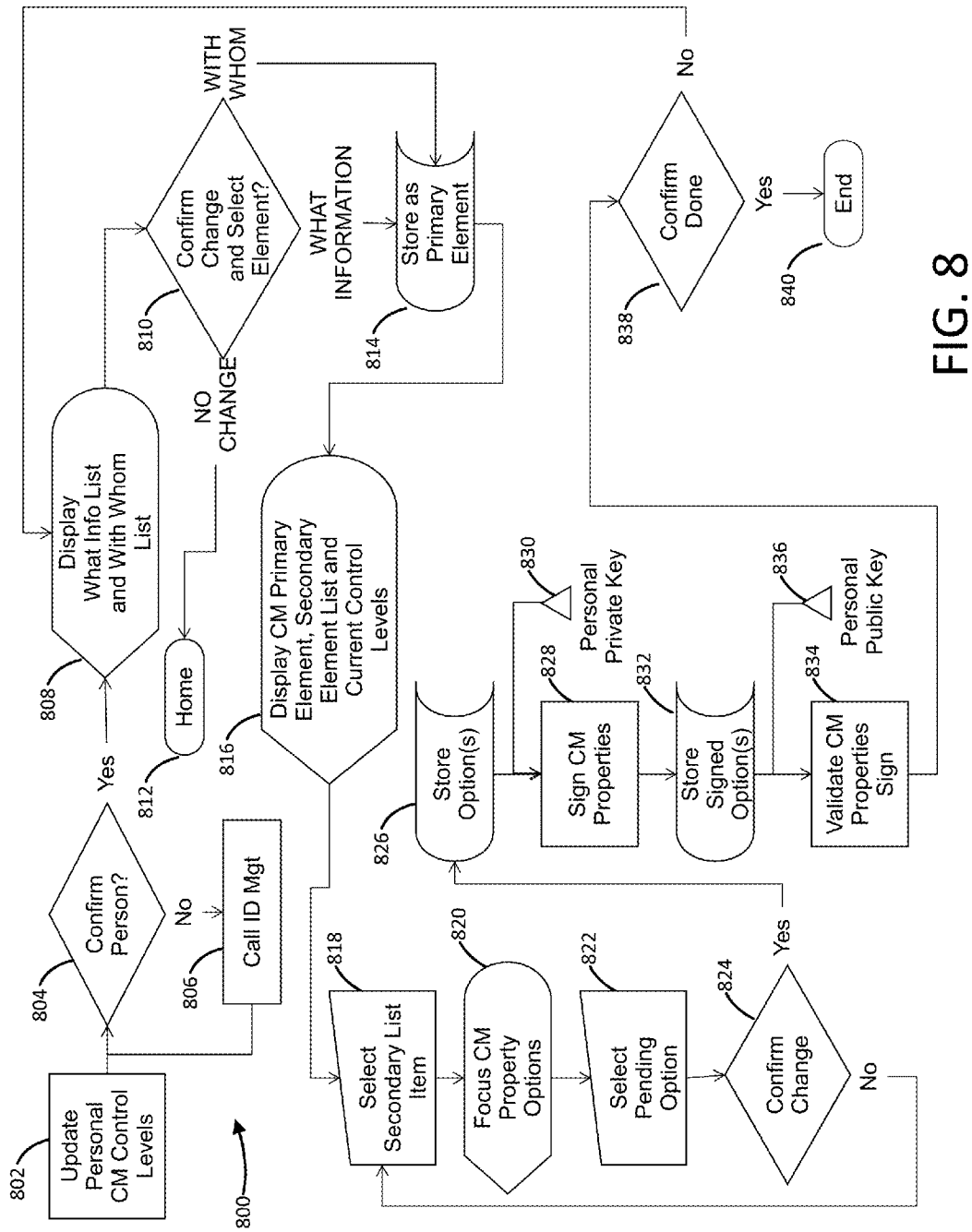
FIG. 8 is a flow chart illustrating an embodiment of a method of updating personal consent management control levels.

Referring now to FIG. 8, an example process 800 for updating consent management elements is shown. The process may, for example, be substantially similar to that illustrated in FIG. 5. A user's personal CM control levels can be updated using the user access control panel 802. First, it can be determined whether the user has been authenticated 804. If not (804: No), the user is referred to ID management 806. If the user is authenticated (804: Yes), the CM elements WHO SHARES; WHAT INFORMATION; and WITH WHOM are displayed 808. The user is prompted to confirm a change to a CM element and to select the CM element to change 810. If the user does not wish to change any CM elements (810: No Change), the user is returned to the home screen 812. If a change is desired, the appropriate CM elements are gathered and stored 814. Notably, the WHO SHARES element is not available because it is known, i.e. the user updating CM elements is WHO SHARES. After the element is stored, the CM primary and secondary element lists and current control levels are displayed 816.

At this point, a user may, for example, be able to select a secondary list item 818. The user can be prompted focused on the CM control level options available for the secondary element selected from the secondary list 820. The user selects a pending option 822, and confirms the change 824. If the change is not confirmed (824: No), the user is directed back to the secondary list 818. If the change is confirmed (824: Yes), the control options are stored 826. After being stored, the CM control levels are digitally signed 828 using personal private key 830. The signed options are stored 832 and validated 834 using personal public key 836. The user is prompted to state whether the CM update process is done 838. If not done (838: No), the user is directed to the element list display 808. If done (838: Yes), the process 800 ends or other processing is performed 840.

In an example, a patient (i.e., subject) decides to revoke consent to share mental health information. The patient, as the subject of the information, updates his consent management profile to reflect his revocation of consent. This change in his consent profile is received at the root server which has already confirmed the patient's identity and provides the authority for the daughter servers to propagate the updated consent management profile. The daughter servers then distribute the consent management profile to the adapters installed at the various enterprises that have records for the patient. To the extent any of those enterprises have mental health information in their records, they will maintain that information but cannot share it with any other enterprises without receiving explicit consent from the patient. Subsequently, any enterprise that requests the patient's medical records from another enterprise, e.g., the patient's health insurance provider, the requesting enterprise will have consent, implied or explicit, to receive the records, except for those concerning mental health.

For example, the requesting enterprise may be a diagnostics provider conducting a blood test at the request of the patient's primary care physician. The diagnostics provider may have implied consent from the patient to receive medical records through the primary care physician. In other words, the relevant consent may be imputed to the diagnostics provider as a result of the primary care physician's request, since the primary care physician may have explicit consent to share those records. However, because the patient has revoked consent to share mental health records, the diagnostics provider may no longer have any consent, implied or otherwise, to receive those records. The adapters installed at the primary care physician and the diagnostic provider, respectively, can be aware of the consent management profile changes. Therefore, when the diagnostic provider requests the patient's medical records, it will receive the patient's prior blood test results, but will not receive the results of a psychological exam.

Later, the patient visits a psychologist, who now must have access to the patient's mental health records. Due to the patient's explicit revocation of consent, however, the psychologist does not have access to those records. At this point the psychologist may request access from the patient. That request is entered by the psychologist's office staff and is received by the adapter. The adapter sends the request to the CMS which, after the psychologist's identity is confirmed, transmits the consent request to the patient, the subject of the medical records. The patient receives the request and decides to grant or deny consent for the psychologist to access the mental health records. The psychologist may require access to treat the patient such that, if the patient denies consent, the psychologist may refuse to provide any treatment. However, it is still the patient who must give consent or forfeit any possible treatment from that psychologist. If the patient does grant consent to access mental health records, that consent may be operative only for that psychologist. Alternatively, the psychologist may require that the consent provided allow access to all psychologists at the hospital or practice where the psychologist is employed. The details of the consent are made explicit in the consent request so that the patient will always be aware of the consent that is requested. It should be noted that the psychologist may have implied or explicit consent to access the patient's non-mental health medical records through, for example, the patient's insurance system. The consent request may only be required, in this example, for access to the mental health records.

After the patient grants the requested consent, the root server may distribute the authority to the relevant daughter server to update the consent profile. The daughter server, pursuant to the authority granted by the root server, can update the consent management profile on other servers and on adapters installed at the enterprises housing the patient's records. After the adapters at the psychologist's office and the patient's primary care physician are properly updated, the psychologist may then be able to access the mental health records housed by the primary care physician.

User controls may be delegated to other people, this is known as User Proxy, and user controls may be performed on alternate devices that may not be able to perform as secure of a transaction as a computer at one's home. For example, there may be cases in which a subject or originator of information cannot provide the consent by themselves. This may occur because of temporary or permanent disability of an individual, the minor status of an individual, and/or the representational status of an organization as an originator (e.g., where the proxy is designated as a representative for the originating organization). In another example, a user may wish to delegate the ability to conduct a transaction to an alternate device such as their mobile phone, tablet, or other less secure process. This may be used when a user normally would conduct the transaction with a legally enforceable strong authentication transaction, but is not able to. In both cases, an auditable event that triggers the delegation may be a legally confirmable event that the user has delegated authority to an alternate person to perform the transaction or a less secure device or method to conduct the transaction.

The subject (or the originator) of information may seek notification of requests for consent to distribute or requests for consent to access. These requests can come from the enterprise holding information that seeks authority to share it with additional resources inside the enterprise. Additionally, a person outside of the organization may simply request access to the records. Examples of mechanisms for notifying end users of requests include Interactive Voice Response (IVR) to a home, office, or mobile number; short messaging service (SMS) and/or multimedia messaging service (MMS) to a mobile number (i.e. a "text message"); email to an email address; push notification to a mobile and/or computing device, and the like.

The user may have the ability to configure, enable, and/or disable notifications of individuals requesting consent to access and/or distribute their information. The user may have the ability to configure, enable, and/or disable notifications of consent management transactions involving their records when those transactions involve implied consent. These may be provided as immediate notifications or summary digest by day or week. The user may have the ability to configure, enable, and/or disable notifications of access transactions conducted as well as the type of consent management (implied or expressed). These may be provided as immediate notifications or summary digest by day or week.

The CMS may publish information in a manner so that authorized individuals can query the CMS to determine if consent exists, in real time, for the transaction they seek to perform. The people who may query the CMS to determine if they have consent are called consumers.

The consumer consent verification workflow can be built as an extension to the current implementation of record sharing within the Nationwide Health Information Network (NwHIN), more recently named, the eHealth Exchange (eHE). In one scenario, to participate in the eHE and submit a query for a record, a consumer must be an approved user of an enterprise that is authorized to connect to the NwHIN.

Going back to the specific case for this example, in eHE there is a Patient Discovery transaction. This transaction may determine if the Patient exists in remote members of the eHE. The system may presume that all patients can, and do want to be discovered by all authorized users conducting a search. With CMS in place, the patient can be empowered, if the enterprise allows them, to consent to Patient Discovery by remote participants in the eHE. Alternatively, the patient can be empowered to be notified that such a request has occurred, and then to allow or deny such a discovery transaction.

Similarly, eHE can have a Record Locator transaction. The Record Locator may be used after Patient Discovery. The practitioner selects the patient name and the enterprise and performs a query using the Record Locator query to pull back a listing from the remote platform of all records on that patient. This is not the entire record; it is just the listing of the records available. Again, the system may presume that all patients can, and do want all of their records to be located by all authorized users conducting a search. With CMS in place, the patient can be empowered, if the enterprise allows them, to consent to location of only certain records by remote participants in the eHE and blocking others. Alternatively, the patient can be empowered to be notified that such a request has occurred, and then to allow or deny such a location transaction.

Finally, eHE may include a Record Retrieval transaction. The Record Retrieval can be used after the Record Locator. The practitioner may select the record for the patient and the enterprise and performs a request using the Record Retrieval to pull that particular record (lab result, prescription, radiology results, etc.) from the remote clinical data repository on that patient. The system may presume that all patients can, and do want all of their records to be shared by all authorized users conducting a search. With CMS in place, the patient can be empowered, if the enterprise allows them, to consent to retrieval of only certain records by remote participants in the eHE and blocking others. Alternatively, the patient can be empowered to be notified that such a request has occurred, and then to allow or deny such a retrieval transaction.

The requesting operator may be a person or enterprise that is the targeted recipient or requestor of a medical record that must ascertain whether or not they have access. The requesting operator may be a member of an enterprise (or a process within an enterprise) that is a registered user of CMS. The consumer may request access to the information through a variety of enterprise capabilities. This could be a health records system, law enforcement information sharing system, a mortgage broker system, or a personnel information system. Each of these systems can have their own way of governing access to information based upon rules, roles, and persons at this time. CMS may provide the enterprise with an easy ability to authenticate and/or validate the consumer before allowing the consumer (i.e., the person who seeks access to information) the ability to transfer, view, modify, or even know that they record exists.

Figure 9:
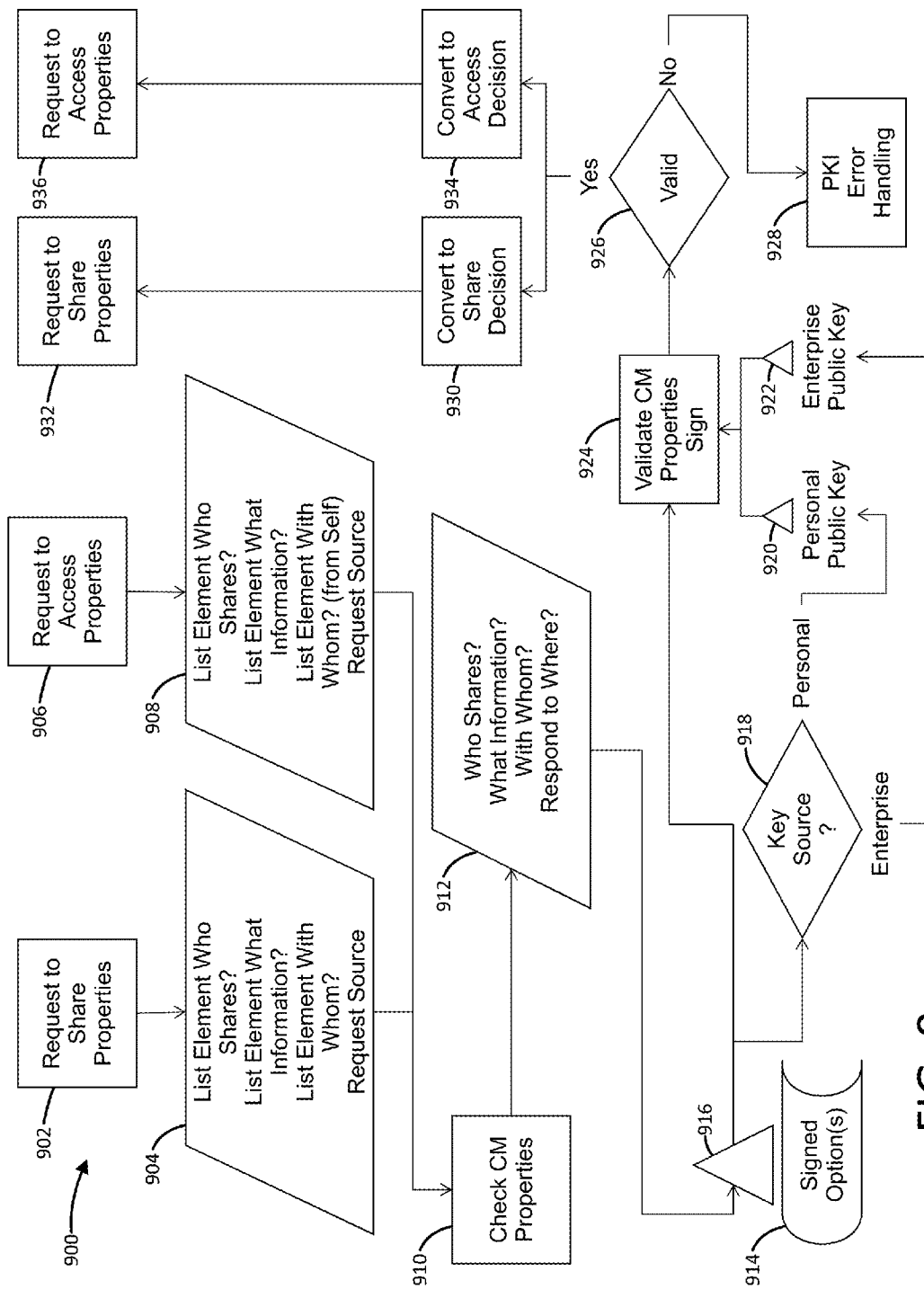
FIG. 9 is a flow chart illustrating an embodiment of a method of requesting share and/or access control levels.

Referring now to FIG. 9, an exemplary process 900 for requesting share and access control levels by a consumer is shown. A consumer requests to share control levels 902 and the CM elements, i.e., WHO SHARES; WHAT INFORMATION; and WITH WHOM are listed 904. Alternatively, a consumer may request to access control levels 906 and the CM elements, i.e., WHO SHARES; WHAT INFORMATION; and WITH WHOM are listed 908. CM control levels are checked 910 and the CM elements are determined 912. The signed CM element control levels are stored encrypted by private key 916. The key source is determined, i.e., whether private key 916 is enterprise or personal. If it is personal (918: Personal) the user's personal public key 920 is used to validate the CM control levels signature 924. If the private key 916 is enterprise (918: Enterprise) the enterprise's public key 922 is used to validate the CM control levels signature 924. If the signature is not valid (926: No), the CMS conducts PKI error handling 928. If the signature is valid (926: Yes), the control level is converted to either a share decision 930 or an access decision 934. In the case that the control level is converted to a share decision 930, the consumer is allowed to share control levels 932. Alternatively, if the control level is converted to an access decision 934, the consumer is allowed to access control levels 936.

A CMS Compliant requesting operator may be so designated because the consumer enterprise system and data application within the enterprise can be fully integrated with CMS. The directories of the enterprise (particularly the users of the application) may be exposed into CMS such that they are a names set of users that can be designated in CMS as WITH WHOM. Further, the application in the enterprise may be fully able to consume both the WHAT INFORMATION and the WITH WHOM and present it under the consent management control levels established by the administrator of the information at its source.

A CMS Aware requesting operator may be so designated because it can make a secure and trusted request of another CMS Compliant enterprise, and because the directories of the enterprise (particularly the users of the application) may be exposed into CMS such that they name a set of users that can be designated in CMS as WITH WHOM. The applications may, for example, not be integrated, so the access control mechanisms on the source side of the transaction need to control access to the information (because the applications on the requesting side of the transaction have not been certified yet as being able to govern control under CMS).

A CMS Non-Compliant requesting operator can be one in which the operator is, for example, not a member of a CMS enterprise at all. In this case, the CMS Non-Compliant requesting operator may be provided access to the information, but trusting the operator is up to the entity holding the information and the sharing operator/subject/originator/owner providing consent to share. In this case, the requesting operator can be provided access using a platform, identity, and access control system established by the entity that controls the information.

Administrative access to CMS may use an IDMS as the identity source. Administrative access to AIDMS may also use a minimum of two-factor authentication (e.g., NIST SP 800-63 Level 3). User access to IDMS may use either IDMS or their enterprise identity management system using SAML assertion into IDMS. User access to IDMS may be with single factor authentication (e.g., NIST SP 800-63 Level 2); however, for possible legal reasons, the digital signature on the consent management repository for an individual may use two-factor authentication (e.g., NIST SP 800-63 Level 3).

All of the apparatus, methods, and algorithms disclosed and claimed herein can be made and executed without undue experimentation in light of the present disclosure. While the invention has been described in terms of preferred embodiments, it will be apparent to those of skill in the art that variations may be applied to the apparatus, methods, and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope, and concept of the invention as defined.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for use in a computer-based consent management system for allowing controlled data to be interactively shared among operators of said computer-based consent management system, the method comprising:

storing, by an electronic circuit included in said consent management system operated by a sharing operator, a control data record in a first database that is included in said consent management system, wherein said control data record contains a plurality of control levels, wherein each of said plurality of control levels defines a distinct set of controls that are applied to controlled data and said plurality of control levels are applied based on reference data associated with a subject;

associating, by said electronic circuit, at least one of said plurality of control levels with at least a portion of a subject data record, wherein said subject data record is associated with the subject and is stored in a second database that is in communication with said consent management system, wherein said at least a portion of the subject data record is controlled data that is associated with said at least one of said plurality of control levels based on reference data associated with said controlled data;

receiving, by said electronic circuit, a consent request from a requesting operator requesting access to said controlled data, wherein said consent request includes reference data associated with the requesting operator;

storing in said first database, by said electronic circuit, a control level data set comprising said at least one of said plurality of control levels associated with said controlled data in said subject data record;

interactively sharing, by said electronic circuit, with the requesting operator, at least a portion of said control level data set based on said one or more control levels associated with the subject, said one or more control levels associated with said controlled data, and said one or more control levels associated with the requesting operator, wherein determination whether to grant the requesting operator access to the controlled data is based on said at least a portion of said control level data set that is interactively shared;

receiving, by said electronic circuit, an update to said control level data set, wherein said update changes one or more of said plurality of control levels;

storing, by said electronic circuit, an updated control level data set in said first database based on said update; and transmitting a revocation of rights to the requesting operator based on said updated control level such that the requesting operator no longer possesses consent to access said controlled data.

2. The method according to claim 1, wherein said controlled data is associated with a one or more owner or originator, and wherein said owner has authority from the subject to possess and interactively share said controlled data, and has authority from the subject to interactively share said control level data set associated with said controlled data, and wherein the originator is an owner that creates at least a portion of said controlled data.

3. The method according to claim 2, wherein said owner or said subject manually associates said one or more of said plurality of control levels with said controlled data.

4. The method according to claim 2, wherein said consent management system automatically associating one or more of said plurality of control levels with said controlled data contained in said subject data record by:
evaluating an information type of said controlled data contained in said subject data record; and
associating said one or more of said plurality of control levels with said controlled data based on said information type of said controlled data.

5. The method according to claim 1, further comprising determining, by said electronic circuit, whether the requesting operator is allowed access to at least a portion of said controlled data based on at least one of said plurality of control levels associated with said controlled data.

6. The method according to claim 1, wherein said plurality of control levels define the extent to which said controlled data is shared by the sharing operator of said computer-based consent management system.

7. The method according to claim 6, wherein said at least a portion of said control level data set is used by the requesting operator to determine whether the requesting operator is allowed access to at least a portion of said controlled data based on at least one of said plurality of control levels associated with said controlled data.

8. The method according to claim 1, wherein said controlled data describes an object.

9. The method according to claim 8, wherein said object and said subject are the same.

10. The method according to claim 9, wherein said object and said subject are different.

11. A federated computer-based consent management system for allowing controlled data to be interactively shared among operators of said computer-based consent management system, the system comprising:
a first database, in communication with a first computer based consent management system operated by a sharing operator, for storing a control data record, wherein said control data record contains a plurality of control levels, and wherein each of said plurality of control levels defines a distinct set of controls that are applied to controlled data and said plurality of control levels are applied based reference data associated with a subject;
a second database, in communication with first computer based consent management system, for storing a subject data record associated with the subject, wherein at least a portion of the subject data record is controlled data that is associated with at least one of said plurality of control levels based reference data associated with said controlled data; and
at least one server having a processor in communication with a computer readable medium that contains program instructions which, when executed, instruct the processor to:
process a consent request, received from a requesting operator operating a second computer based consent management system, requesting access to said controlled data, wherein said consent request includes reference data associated with the requesting operator;
store, in said first database, a control level data set comprising said at least one of said plurality of control levels associated with said controlled data in said subject data record;
interactively share, with the requesting operator, at least a portion of said control level data set based on said one or more control levels associated with the subject, said one or more control levels associated with said controlled data, and said one or more control levels associated with the requesting operator, wherein a determination whether to grant the requesting operator access to the controlled data is based on said at least a portion of said control level data set that is interactively shared;
store an updated control level data set in said first database based on an update, received from the sharing operator, which changes one or more of said plurality of control levels; and
transmit a revocation of rights to the requesting operator based on said updated control level such that the requesting operator no longer possesses consent to access said controlled data.

12. A system according to claim 11, wherein said federated computer-based consent management system comprises a plurality of computer-based consent management systems, and wherein the program instructions, when executed, further instruct the processor to:
store, in said first database, a control level data set for each of a plurality of requesting operators operating said plurality of federated computer-based consent management systems; and
interactively share said control level data set with each of the plurality of requesting operators based on at least a portion of said control level data set associated each requesting operator.

13. The system according to claim 11, wherein said controlled data is associated with a one or more owner or originator, and wherein said owner has authority from the subject to possess and interactively share said controlled data, and has authority from the subject to interactively share said control level data set associated with said controlled data, and wherein the originator is an owner that creates at least a portion of said controlled data.

14. The system according to claim 13, wherein said owner or said subject manually associates said one or more of said plurality of control levels with said controlled data.

15. The system according to claim 13, wherein said federated computer-based consent management system automatically associating one or more of said plurality of control levels with said controlled data contained in said subject data record by:
evaluating an information type of said controlled data contained in said subject data record; and
associating said one or more of said plurality of control levels with said controlled data based on said information type of said controlled data.

16. The system according to claim 11, wherein said program instructions, when executed, further instruct the processor to determine whether the requesting operator is allowed access to at least a portion of said controlled data based on at least one of said plurality of control levels associated with said controlled data.

17. The system according to claim 11, wherein said plurality of control levels define the extent to which said controlled data is shared by the sharing operator of said federated computer-based consent management system.

18. The system according to claim 17, wherein said at least a portion of said control level data set is used by the requesting operator to determine whether the requesting operator is allowed access to at least a portion of said controlled data based on at least one of said plurality of control levels associated with said controlled data.

* * * * *